(12) United States Patent
Tanaka

(10) Patent No.: US 6,247,066 B1
(45) Date of Patent: Jun. 12, 2001

(54) COMPOUND DOCUMENT PROCESSING METHOD

(75) Inventor: Tetsuo Tanaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/744,068

(22) Filed: Nov. 4, 1996

(30) Foreign Application Priority Data

Nov. 6, 1995 (JP) .................................................. 7-287002

(51) Int. Cl.[7] .................................................. G06F 9/54
(52) U.S. Cl. ........................................... 709/320; 707/515
(58) Field of Search .................................... 395/680, 682, 395/683; 707/515, 516; 709/310–332

(56) References Cited

U.S. PATENT DOCUMENTS 5,659,676 * 8/1997 Redpath ................................ 707/515
5,752,055 * 5/1998 Redpath et al. ...................... 707/515

OTHER PUBLICATIONS

Heller, Martin, "Future Documents," BYTE, pp. 126–131, May 1991.*
North, Ken, "Understanding OLE," DBMS, pp(10), Jun. 1995.*
Kurt Piersol "Building an OpenDoc Part Handler" MacTech Magazine pp. 1–12, Sep. '94.*
Wang et al. "An Event–Object Recovery Model for Object-t–Oriented User Interfaces" ACM pp. 107–115, Nov. '91.*

* cited by examiner

Primary Examiner—St. John Courtenay, III
(74) Attorney, Agent, or Firm—Mattingly, Stanger & Malur, P.C.

(57) ABSTRACT

A document processing method, upon preparing or editing a compound document, eliminate the need for repeating such operations as to start one of application programs associated with one of child documents of the compound document and to select its function from a menu or the like of the application program with respect to all the child documents. A system for preparing the compound document has tables which holds correspondence relationships between the function and command names, argument names and argument values determined for the respective application programs for calling the function. When receiving a command for editing a parent document, the system generates a command to the embedded child document on the basis of the correspondence relationships and also executes the received command even over the other embedded document.

3 Claims, 26 Drawing Sheets

FIG.4

108 COMMAND CORRESPONDENCE TABLE

| FUNCTION / TYPE<br>AP'S ID | SEARCH | SPELL CHECK | FONT CHANGE | FONT SIZE CHANGE | LINE WIDTH | ... |
|---|---|---|---|---|---|---|
| | B-1 | B-n | A | A | A | |
| WORD PROCESSOR 1 | EditFind | SplCheck | Font | Font | — | |
| WORD PROCESSOR 2 | FindString | CheckSpelling | FontStyle | FontSize | — | |
| SPREADSHEET 1 | Find | CheckSpelling | Style | Size | — | |
| DRAWING 1 | Find | — | Font | FontSize | LineWidth | |
| DRAWING 2 | Search | Spell | Font | FontSize | LineWidth | |
| PRESENTATION 1 | StrSeach | SplCheck | FntStyle | FntSize | LineWidth | |
| ... | | | | | | |

COLUMN 0 — COLUMN 1 — COLUMN 2 — COLUMN 3 — COLUMN 4 — COLUMN 5

ROW 0, ROW 0-1, ROW 1, ROW 2, ROW 3, ROW 4, ROW 5, ROW 6

FIG.5

109 COMMAND ARGUMENT CORRESPONDENCE TABLE

| | AP NAME | WORD PROCESSOR 1 | SPREADSHEET 1 | DRAWING 1 | WORD PROCESSOR 2 | ... |
|---|---|---|---|---|---|---|
| | COMMAND NAME | EditFind | Find | FindString | FindString | |
| RETURN VALUE | FOUND | 1 | TRUE | 1 | TRUE | |
| | NOT FOUND | 0 | FALSE | 0 | FALSE | |
| ARGUMENT | SEARCHING CHARACTER STRING (MUST) | Find ⟨CHARACTER STRING⟩ | what ⟨CHARACTER STRING⟩ | String ⟨CHARACTER STRING⟩ | String ⟨CHARACTER STRING⟩ | |
| | SEARCHING DIRECTION | Direction | direction | — | Direction | |
| | NEXT | 0 | Next | | FALSE | |
| | PREVIOUS | 1 | Previous | | TRUE | |
| | UPPER/LOWER CASES | MatchCase | matchCase | Case | Case | |
| | NON-DISTINCTION | 0 | FALSE | 0 | FALSE | |
| | DISTINCTION | 1 | TRUE | 1 | TRUE | |
| | SINGLE/DOUBLE BYTE CHARACTERS | MatchByte | — | — | — | |
| | NON-DISTINCTION | 0 | | | | |
| | DISTINCTION | 1 | | | | |
| | SEARCHING DIRECTION | — | searchOrder | — | — | |
| | ROW PRIORITY | | ByRow | | | |
| | COLUMN PRIORITY | | ByCol | | | |
| | ⋮ | | | | | |

COLUMN 0, COLUMN 1, COLUMN 2, COLUMN 3, COLUMN 4

ROW 0, ROW 1, ROW 2-1, ROW 2-2, ROW 3-0, ROW 3-1, ROW 4-0, ROW 4-1, ROW 4-2, ROW 5-0, ROW 5-1, ROW 5-2, ROW 6-0, ROW 6-1, ROW 6-2, ROW 7-0, ROW 7-1, ROW 7-2

FIG.10

110 AP (DRAWING 1) COMMAND CORRESPONDENCE TABLE

| FUNCTION / AP'S ID | SEARCH | FONT CHANGE | FONT SIZE CHANGE | LINE WIDTH | ... |
|---|---|---|---|---|---|
| DRAWING 1 | FindString | Font | FontSize | LineWidth | ... |

FIG.11

111 AP (DRAWING 1) COMMAND ARGUMENT CORRESPONDENCE TABLE

| COMMAND NAME | | FindSize |
|---|---|---|

| COMMAND NAME | | Font |
|---|---|---|

| COMMAND NAME | | FindString | |
|---|---|---|---|
| RETURN VALUE | FOUND | | 1 |
| | NOT FOUND | | 0 |
| ARGUMENT | SEARCHING CHARACTER STRING | String | |
| | | | ⟨CHARACTER STRING⟩ |
| | UPPER / LOWER CASES | Case | |
| | NON-DISTINCTION | | 1 |
| | DISTINCTION | | 0 |

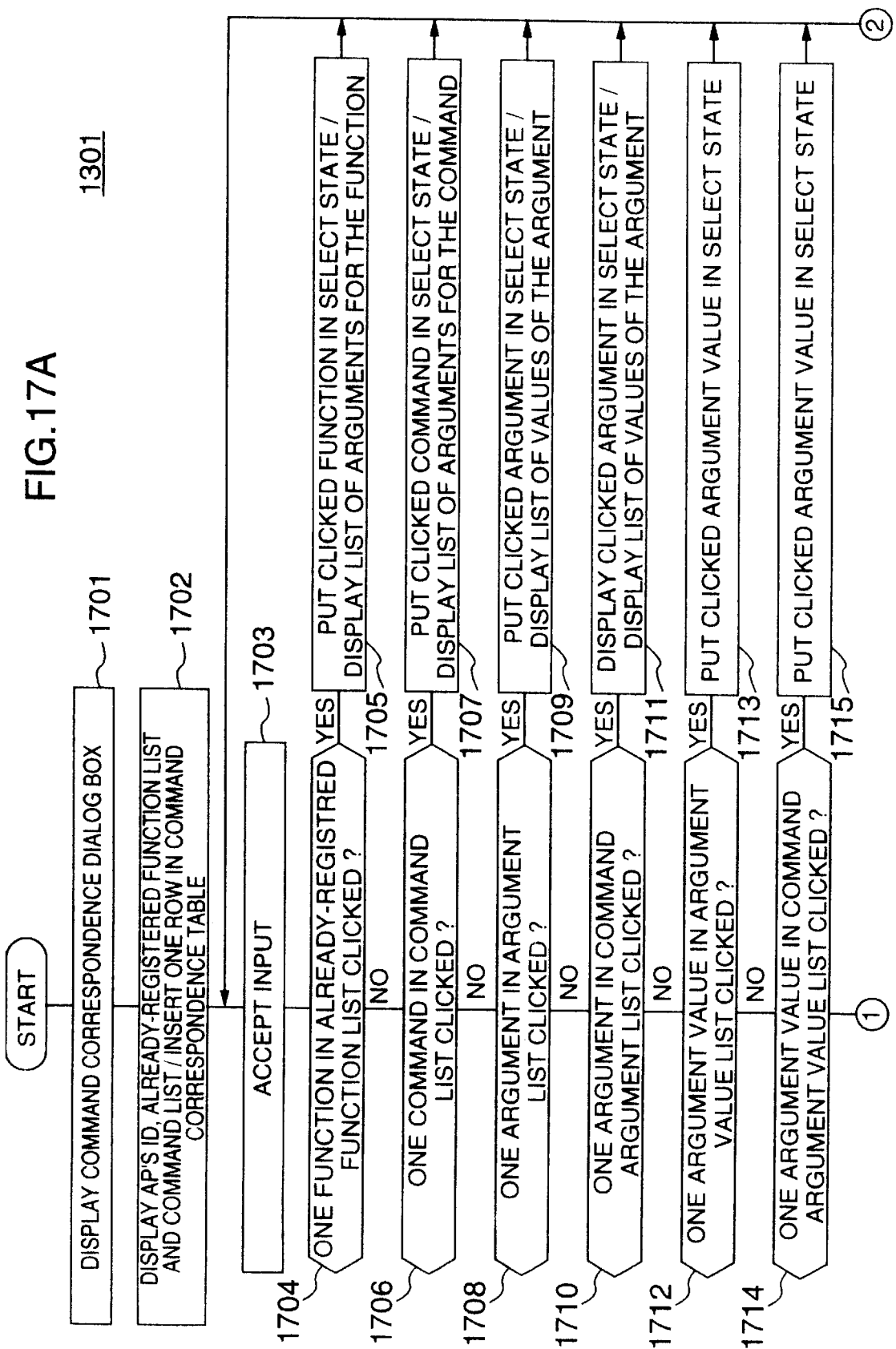

FIG.20A

1901 MENU / COMMAND CORRESPONDENCE TABLE

| MENU ITEM | | DIALOG | COMMAND |
|---|---|---|---|
| FILE | ... | ... | ... |
| EDIT | COPY | — | Copy |
| | PASTE | — | Paste |
| | DELETE | — | Delete |
| | SEARCH | DIALOG 1 | FindString |
| | REPLACE | DIALOG 2 | ChangeString |
| | ... | ... | ... |
| ... | ... | ... | ... |

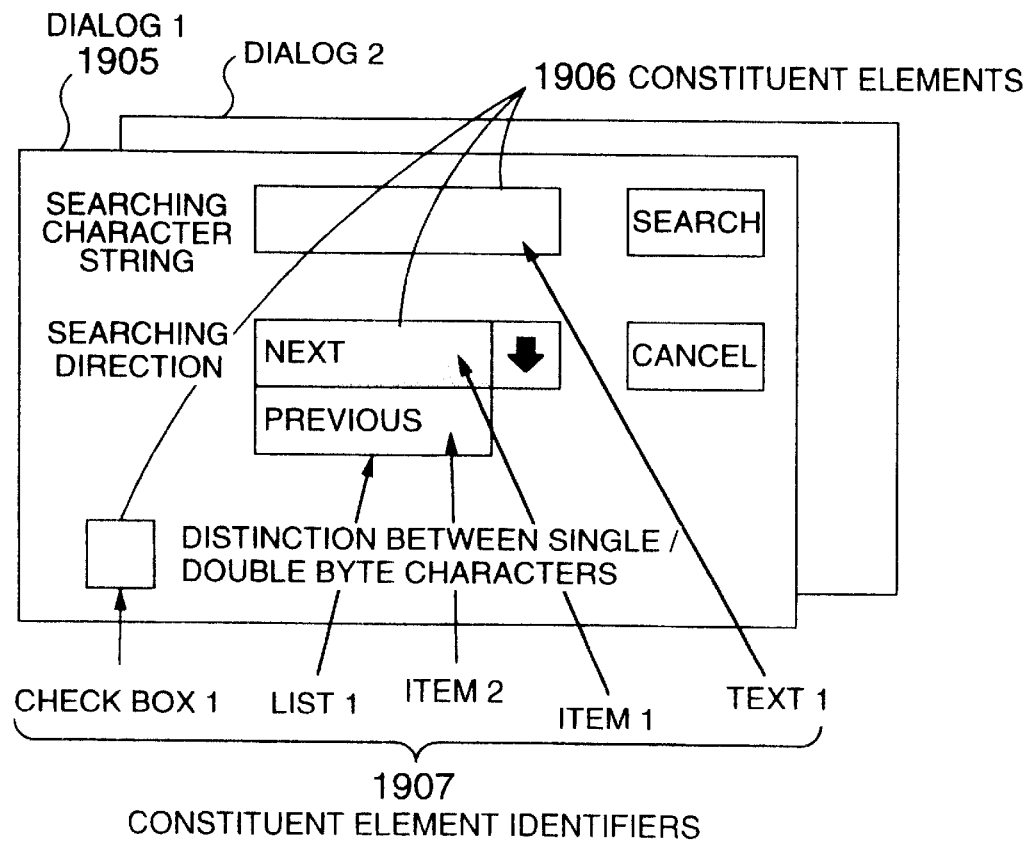

DIALOG 1 1905
DIALOG 2
1906 CONSTITUENT ELEMENTS
SEARCHING CHARACTER STRING
SEARCH
SEARCHING DIRECTION
NEXT
PREVIOUS
CANCEL
DISTINCTION BETWEEN SINGLE / DOUBLE BYTE CHARACTERS
CHECK BOX 1   LIST 1   ITEM 2   ITEM 1   TEXT 1
1907 CONSTITUENT ELEMENT IDENTIFIERS

FIG.20C

1908 DIALOG / ARGUMENT CORRESPONDENCE TABLE

| ELEMENTS IN DIALOG BOX (1909) | | ARGUMENT (1910) | |
|---|---|---|---|
| TEXT 1 | | String | |
| | | | ⟨CHARACTER STRING⟩ |
| LIST 1 | | Direction | |
| | ITEM 1 | | 1 |
| | ITEM 2 | | 0 |
| CHECK BOX | | Case | |
| | CHECK | | 1 |
| | NO CHECK | | 0 |

COMPOUND DOCUMENT PROCESSING METHOD

BACKGROUND OF THE INVENTION

The present invention relates to a method for processing information implemented on a work station or a personal computer and, in particular, such documents as texts, tables or graphs. More particularly, the present invention relates to a method for processing a single compound document which corresponds to a combination of a plurality of documents prepared or edited with use of a plurality of application programs. The invention also concerns a method for processing different types of documents prepared with use of different kinds of application programs, by which an identical function is applied to the different kinds of documents.

Much attention has been focused on such a technique as to embed a document (such as a chart, figure or table prepared with use of drawing software, or a table or graph prepared with use of a spreadsheet program) prepared with use of one application software or program into a document (such as a document prepared with use of word processing software) prepared with use of another application program. Such a technique is described, e.g., in a magazine entitled "NIKKEI OPEN SYSTEM", January 1994, pp. 143–150 (which will be referred to as reference 1, hereinafter). In this technique, a document prepared with use of one application program can be embedded into a document prepared with use of another application program. Further, when an operator or user double-clicks the embedded document, this causes the application program having prepared the document to be started up or activated, so that the user can perform edits over the document. Furthermore, functions made available by the application program can be utilized in an external program in the form of functions.

Also disclosed in a magazine entitled "BYTE", 1993, pp. 22 and 24 (which will be referred to as reference 2, hereinafter) is a technique which follows. That is, in the disclosure, in the case where an application program exports its functions to external programs, when a language by which the operation spanning a plurality of application programs can be described is employed, the functions of the application program can be called from other application programs. As a result, change in the format of a document contained in a spreadsheet program, insertion of a text therein or the like can be realized, for example, on a word processor program.

A document corresponding to a combination of a document prepared with use of an application program as well as a document prepared with use of another application program and embedded thereinto, will be called a compound document, hereinafter. Further, when documents 2, 3, ..., and n are embedded into a document 1, the document 1 is called a parent document for the documents 2, ..., and n; whereas the documents 2, ..., and n are called child documents for the document 1.

In addition, descendent documents are defined as follows. That is, (1) a child document for the document 1 is defined as a descendent document for the document 1. (2) A descendent document for the child document of the document 1 is defined as a descendent document for the document 1.

A relationship between the parent and child documents is a relative one. More specifically, when the document 2 is embedded into the document 1 and the document 3 is embedded into the document 2, the document 2 is a child document of the document 1 and at the same time, is a parent document of the document 3.

In reference 1 and 2, a function made available by an application program can be exported to an external program. However, a command for calling the function varies from application program to application program (which is also described even in reference 2). In other words, in references 1 and 2, no consideration has been paid to the fact that 'a descendent document is also processed at the same time on an editing interface of the parent document'.

Accordingly, when a command is executed to the parent document during edition of the compound document, the command cannot be applied to its descendent document. For example, when a search command for a character string is executed on a word processor program, the searching cannot be applied to a table prepared with use of a spreadsheet program and embedded into a word-processor-prepared document and also to a character string in a figure prepared with a drawing software program. In other words, when it is desired for a user to process a descendent document within a compound document, it is necessary to perform the following operations. That is, an application program as the creator of the descendent document must be started up and a command must be selected from a menu or the like of the application program. Further, when there are present a plurality of descendent documents, the user must respectively execute the aforementioned operations with respect to each of the descendent documents.

Furthermore, references 1 and 2 cannot process a plurality of documents prepared with different kinds of application programs with use of a single command. For example, it is impossible to judge with use of a single command whether or not there is present a specified character string in the plurality of documents. In order to apply the same function to the plurality of documents, application programs corresponding to the respective documents must be started up and respective commands must be selected from associated menus of the application programs.

SUMMARY OF THE INVENTION

The present invention has been made to solve the above problems. It is therefore a first object of the present invention, even when it is desired to edit a compound document corresponding to a combination of a document with use of an application program as well as a plurality of documents prepared with use of other different kinds of application programs and embedded thereinto, to enable realization of desired processing thereover without need for performing any troublesome operations. In other words, this means that it can be made unnecessary for a user to repetitively perform such troublesome operations of 'starting up the application program corresponding to associated one of the respective descendent documents and selects its function from a menu or the like of the application program' with respect to each of the programs, and the function can also be applied even to the other descendent documents.

A second object of the present invention is, even when it is desired to process a plurality of different types of documents prepared with use of different kinds of application programs, to enable realization of desired processing thereover without need for performing any troublesome operations. In other words, this means that it can be made unnecessary for a user to repetitively perform such troublesome operations that 'the user starts up the application program corresponding to an associated one of the respective descendant documents with respect to each of the programs and selects its function from a menu or the like of the application program', and the same function can be applied even to the other different kinds of documents.

For the purpose of attaining the above objects, the present invention employs such arrangements as follows.

In accordance with an aspect of the present invention, there is provided an information processing method in a computer system which has input means for inputting an instruction from a user and which uses at least first and second application programs to perform predetermined operations. The method comprises the step of previously holding a correspondence relationship between an operation carried out by the first application program and an operation carried out by the second application program associated with the operation of the first application program; when the user enters the instruction to the first application program through the input means, causing the first application program to perform the operation to the entered instruction; and on the basis of the correspondence relationship, causing the second application program to perform the operation associated with the operation of the first application program to the entered instruction.

In accordance with another aspect of the present invention, there is provided a compound document processing method in a document processing system in which document preparation is carried out with use of at least first and second application programs, and a child document prepared with use of the second application program is embedded into a parent document prepared with use of the first application program. The method comprises the steps of previously holding a correspondence relationship between operations having a similar function with respect to an operation carried out over the document prepared with use of the first application program per se and an operation carried out over the document prepared with use of the second application program per se; and in performing a predetermined operation over the child document embedded into the parent document performing an operation having a function similar to the predetermined operation over the embedded child document on the basis of a previously-associated correspondence relationship.

More in detail, for the purpose of attaining the first object, the system of the present invention comprises means such as a keyboard or a mouse for inputting an instruction from a user, means for enabling one application program to utilize a function available from another application program by issuing a command corresponding to the function, means for holding a first correspondence relationship between the function and command names determined for the respective application programs for calling the function, means for holding a second correspondence relationship between arguments necessary for calling the respective functions and arguments determined for the respective application programs, means for identifying one of the application programs which prepares the document, and means for causing a parent document prepared with use of an application program to have one or more child documents prepared with use of other application programs and embedded into the parent document. And the method of the present invention for processing a compound document comprises the step of inputting a command for the parent document from the user through the instruction input means, applying the input command to the parent document, identifying the application programs associated with the respective descendent documents through the application identifying means, transforming or converting the input command to a command executable for each of the descendent documents on the basis of the first and second correspondence relationships, and issuing the converted command to the application program associated with each of the descendent documents from the above-mentioned means for enabling one application program to utilize the function available from another application program to thereby apply the command to the descendent document.

For the purpose of attaining the above second object, further, the system of the present invention comprises means such as a keyboard or a mouse for inputting an instruction from a user, means for enabling one application program to utilize a function available from another application program by issuing a command corresponding to the function, means for holding a first correspondence relationship between the function and command names determined for the respective application programs for calling the function, means for holding a second correspondence relationship between arguments necessary for calling the respective functions and arguments determined for the respective application programs, and means for identifying one of the application programs which prepares the document. And the method of the present invention for processing different kinds of documents comprises the steps of inputting names of one or more documents to be processed, inputting a command, identifying application programs associated with the respective documents, converting the input command to a command executable for each of the documents, and applying the converted command to the associated document.

In the present invention, when it is desired to process a compound document, a user's input of a command for the parent document causes the input command to be transformed or converted to a command executable for the descendent documents, so that the converted command can be executed to the descendent documents. Therefore, it can be made unnecessary for the user to repeat such troublesome operations as to 'start up one of the application programs associated with one of the descendent documents and to select the function from a menu or the like of the application program' with respect to each of the descendent documents.

Further, when it is desired to process a plurality of different kinds of documents, a user's input of a command for one of the documents causes the input command to be converted to commands executable for the other documents, so that the converted commands can be executed to the documents. Therefore, it can be made unnecessary for the user to repeat such troublesome operations as to 'start up one of the application programs associated with one of the documents and to select the function from a menu or the like of the application program' with respect to each of the documents.

BRIEF DESCRIPTION OF THE DRAWINGS

FIG. 4 is a command correspondence table;

FIG. 5 shows a command argument correspondence table;

FIG. 10 shows a command correspondence table for each application program;

FIG. 11 shows command argument correspondence tables for each application program;

FIGS. 17A and 17B shows a second example of the flowchart of the processing operations of the command registration section;

FIG. 20A is a menu/command correspondence table;

FIG. 20B shows dialog boxes in the menu/command correspondence table of FIG. 20A;

FIG. 20C is a dialog/argument correspondence table;

DESCRIPTION OF THE PREFERRED EMBODIMENTS

Embodiments of the present invention will be detailed with reference to the accompanying drawings. Explanation will be made first in connection with a first embodiment.

Figure 1:
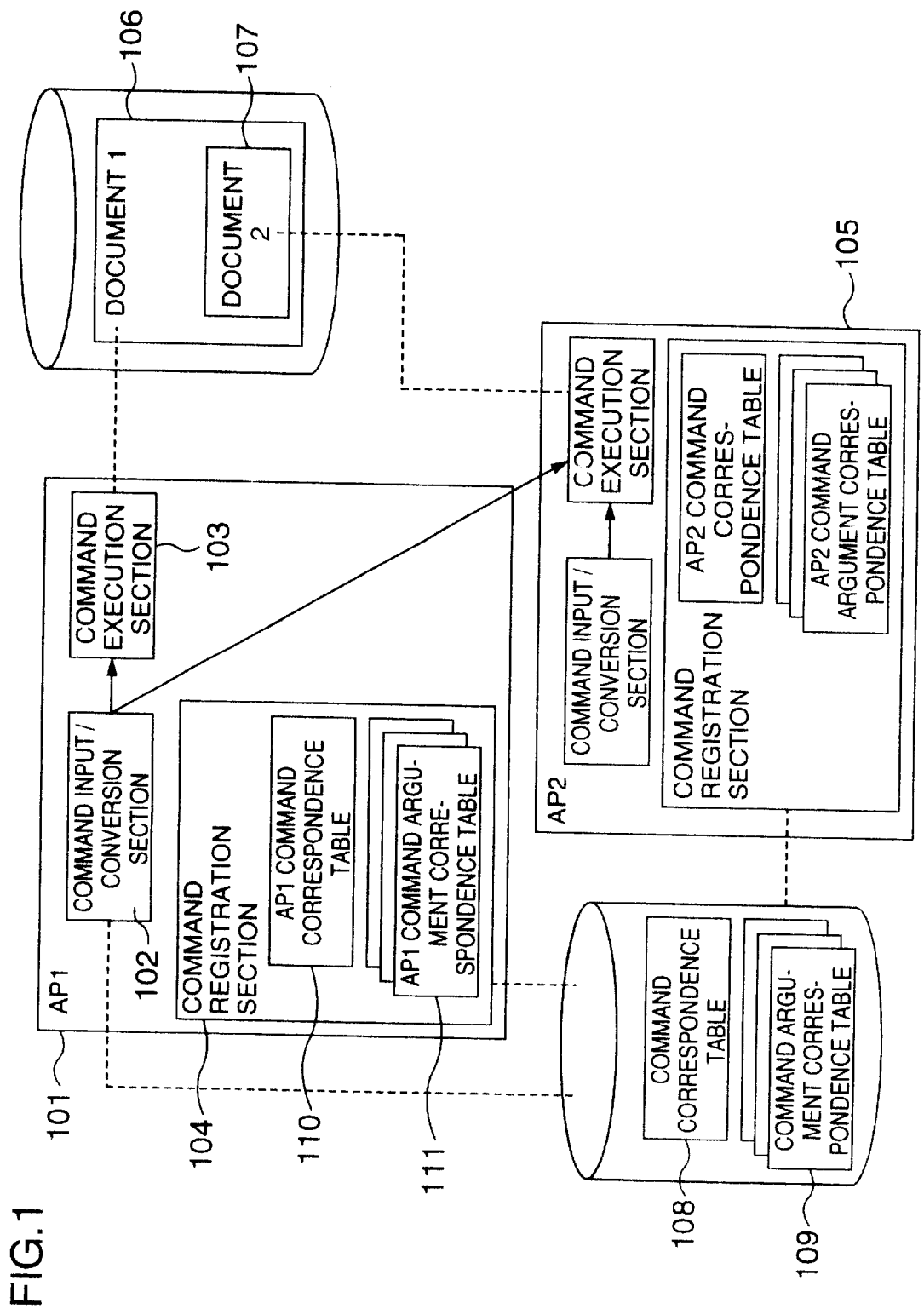
FIG. 1 shows a first example of a software arrangement in the present invention.

Referring first to FIG. 1, there is shown a software arrangement when a compound document corresponding to a combination of a document 1 (106) and a document 2 (107) embedded thereinto is processed. In FIG. 1, reference symbols AP1 (101) and AP2 (105) denote application programs for preparation and editing of the document 1 (106) and document 2 (107) respectively. These application programs each have a command input/conversion section 102 which functions to convert an input received from a user into a command executable for the associated application program. Each application program also has a command execution section 103 which executes the converted command and a command registration section 104 which registers the command executable by the application program.

Reference numeral 108 denotes a command correspondence table which holds a correspondence relationship between the functions and commands of the respective application programs. Numeral 109 denotes a command argument correspondence table which holds a correspondence relationship between the command arguments and their meanings of the respective application programs. That is, one table 109 is provided for each function. The command correspondence table and command argument correspondence table are updated by a command registration section 104 and referred to by the command input/conversion section 102.

The command registration section 104 in turn has a command correspondence table 110 and a command argument correspondence table 111 relating to the respective application programs.

Figure 2:
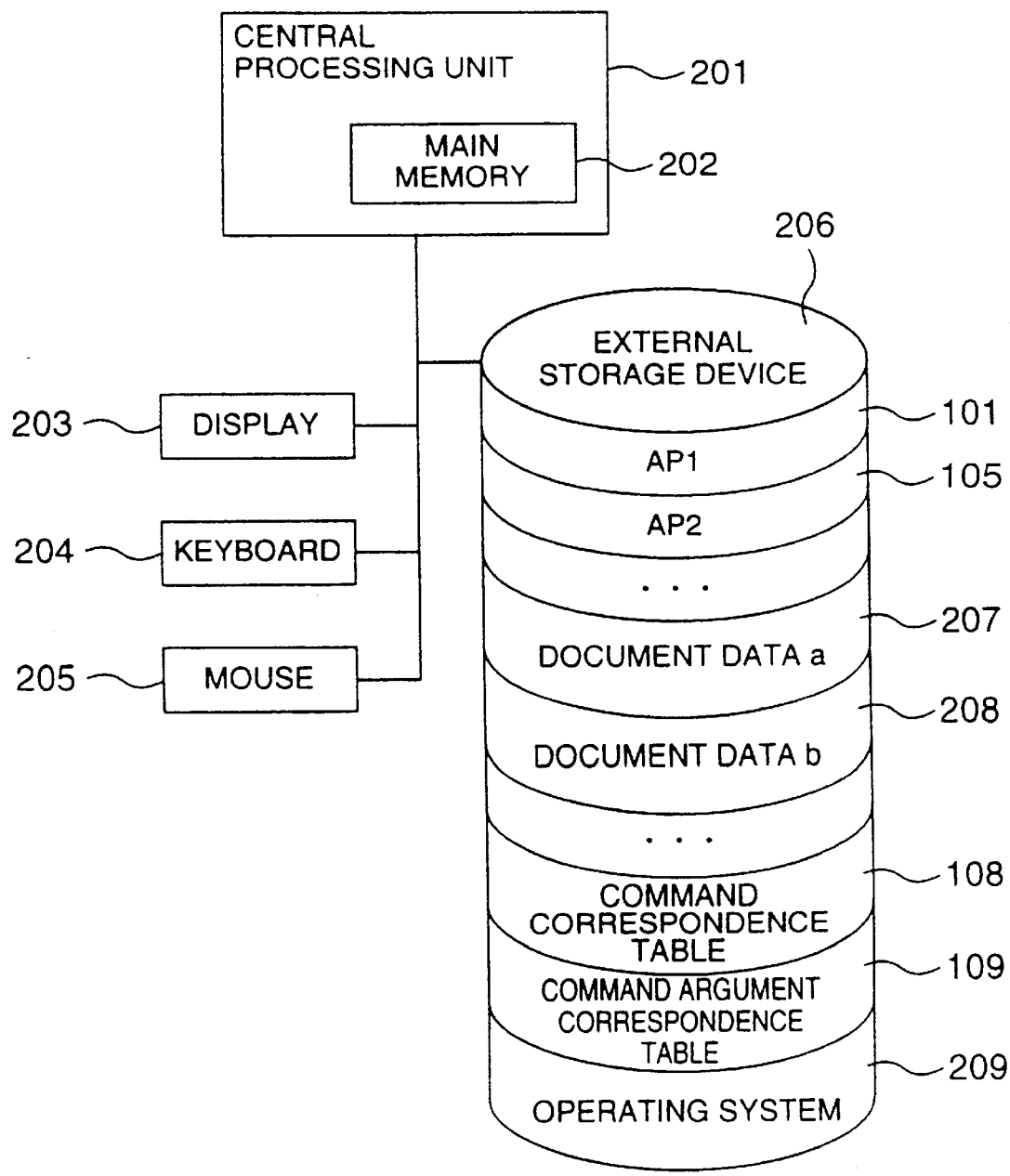
FIG. 2 shows a hardware arrangement in the present invention.

Shown in FIG. 2 is a block diagram of a hardware arrangement of a compound-document processing system. The system illustrated in FIG. 2 includes a central processing unit 201, a main memory 202, a display 203 on which an execution result of an application program is displayed, a keyboard 204 and a mouse 205 for accepting an input from a user, and an external storage device 206 such as a hard disk drive. Contained or stored in the external storage device 206 are a plurality of application programs (such as application programs 101 and 102), document data 207, 208, ..., the command correspondence table 108, the command argument correspondence table 109, and an operating system 209. The programs and data stored in the external storage device 206 are transferred to the main memory 202 of the central processing unit 201 to be processed therein.

Figure 3:
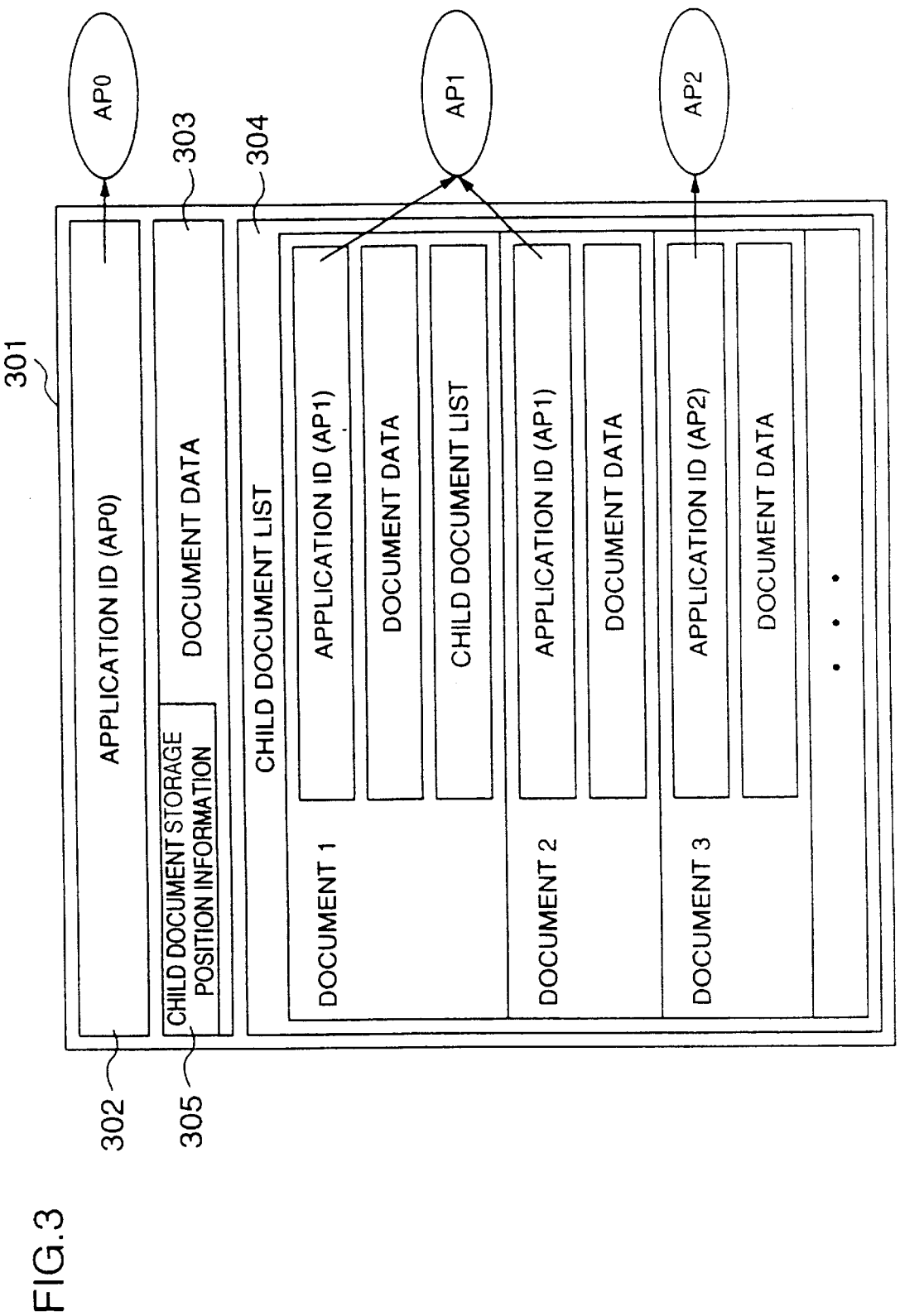
FIG. 3 shows a structure of a document to be processed in accordance with the present invention.

FIG. 3 is a block diagram of a structure of a compound document. A document 301 contains an application identification (ID) 302 for discriminating the application program for preparation and editing of the document in question from the other application programs, document data 303 and a list 304 of child documents embedded into the document 301. Similarly, each child document also contains such an application program ID, document data and child document list as mentioned above. When there is no such child document embedded into the document as in the document 2 or 3 in FIG. 3, such child document list does not exist. Similarly to the documents 1 and 2 in FIG. 3, documents prepared with use of the same application program take an identical application program ID value. The document data 303 contains child document storage position information 305 indicative of an embed position and range of the child document embedded into the document in question. An application program corresponding to a part specified on the editing document can be identified with use of the child document storage position information 305 and child document list 304, and further a command and argument transformation in the present invention can be executed on the basis of the identification result. In the presence of a descendent document, further, the descendent document storage position information is stored in the document data of the child document.

There is shown in FIG. 4 an example of a command correspondence table 108 which holds a correspondence relationship between the functions and commands of respective application programs. In the drawing, row 0 indicates a list of functions already registered; row 1 and subsequent rows indicate lists of commands usable in application programs having the application program IDs such as word processor 1, word processor 2, spreadsheet 1, drawing 1, drawing 2, presentation 1, ... respectively. Each command can perform the same function as shown in the same column of the row 0. Symbol "-" means that the application program corresponding to the associated row has no function corresponding to its column. Row 0-1 in the command correspondence table 108 of FIG. 4 stores therein the types of the commands corresponding to the respective functions, and the command input/conversion section 102 carries out its operation according to the command type, which will be explained later.

Shown in FIG. 5 is the command argument correspondence table 109 for holding herein a correspondence relationship between the command arguments and their meanings of the application programs. That is, FIG. 5 shows an example of a research function correspondence table. One command argument correspondence table is provided for each function. In FIG. 5, row 0 indicates a list of the application programs already registered. Row 1 indicates names of the commands for performing the functions of the table on the respective application programs. Row 2 indicates correspondence relationships between the return values of the commands and their meanings. For example, when a command "EditFind" for the word processor program 1 is executed, the return value "1" means; whereas, the return value "0" means not found. Row 3 and subsequent rows indicate correspondence relationships among the argument names and values of the commands and their meanings. In the rows n-0, n-1, 2, . . . (n=3, 4 . . . ), rows n-0 indicate argument names and rows n-1, n-2, . . . indicate possible argument values. In column 1 of row 4, for example, an argument indicative of the search direction of the command "EditFind" for the word processor program 1 has a name "Direction". The value "0" of the argument "Direction" means to perform a searching operation in the next direction (forward direction); whereas, the value "1" means to perform 20 searching operation in the previous direction (backward direction).

In the row n-1 and subsequent rows, a part surrounded by "<" and ">" indicates its possible argument value type. For example, <character string> at the row 3 and column 1 indicates that the searching object of the command "EditFind" for the word processor program 1 is of a character string type. Further, in the presence of a mark "must" 501 in the row 0, this means that its argument is essential, that is, it cannot be omitted. The first row (row n-1) for each argument takes a default when the argument is not specified.

FIGS. 6 to 9 shows flowcharts for explaining flows of processing operations of the command input/conversion section 102 when a command is executed in response to a user's input.

Explanation will now be made as to the types of commands. The commands are divided into type A and B. The commands of the type A function to collectively process an entire document or a selected part of the document, such as to change character font or line size or thickness. The commands of the type B function, with respect to an entire document or a selected part of the document, to refer to contents of the document sequentially from its cursor position or from the top of the document or selected part thereof, and to end when the reference is made as far as the last or when the reference is once made, such as to search, replace or spell-check a character string.

When a command is of the type B, selection of a function item corresponding to the command from a menu causes the command to be executed. The commands of the type B are further subdivided according to their operational case into a subtype B-1 when the command is only once executed and a subtype B-n when the command is repetitively executed until the user instructs the termination of the command or until the command completes its operation over the entire document or selected part thereof. In the case of the type B commands, a return value correspondence relationship becomes essential in the command argument correspondence table 109. In the types of the commands given in the row 0-1 of the table 108 of FIG. 4, symbols "A", "B-1" and "B-n" indicate that the associated command is of the type A or B, indicative of only once command execution and indicative of repetitive command execution respectively.

Figure 6:
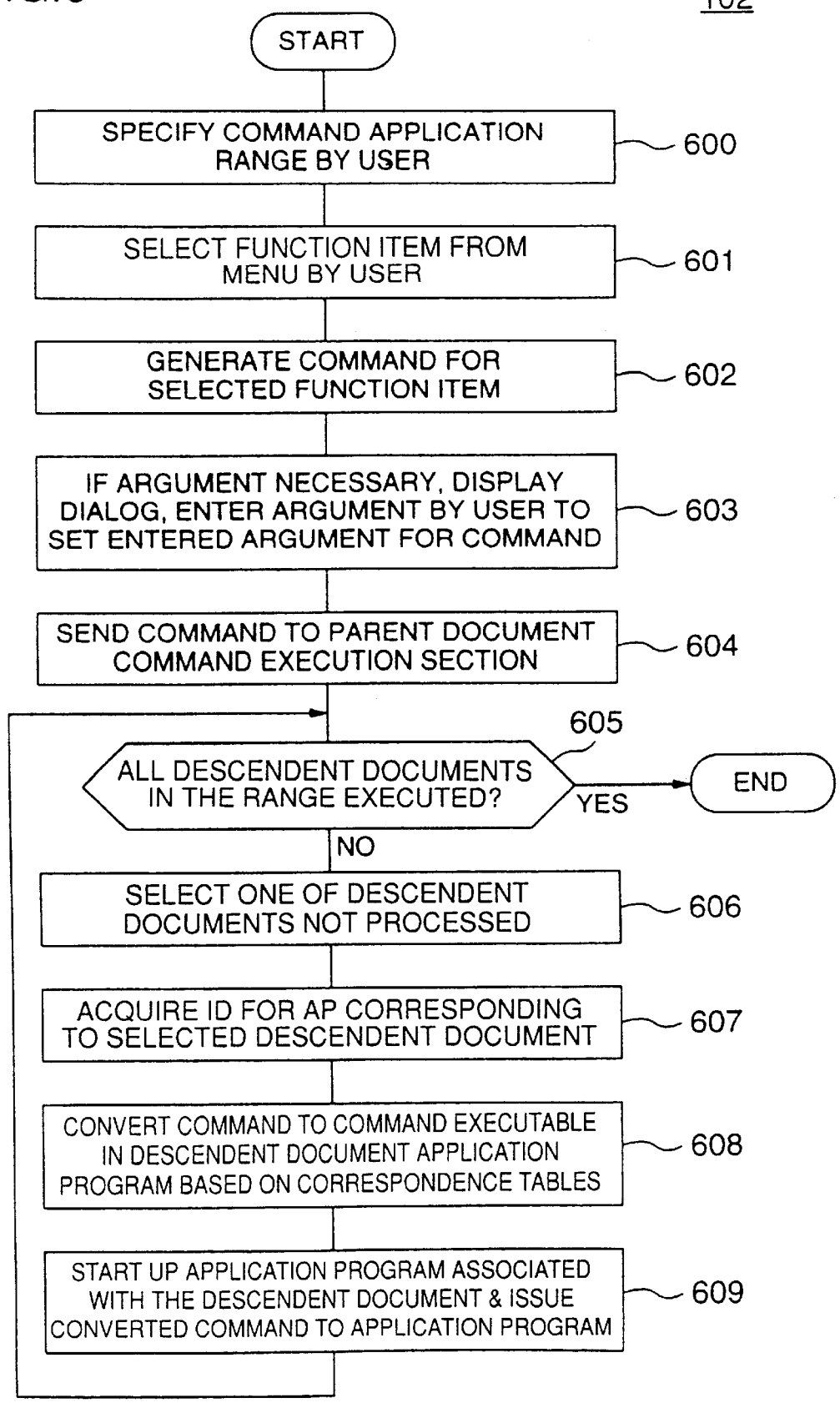
FIG. 6 is a first example of a flowchart showing flows of operations in a command input/conversion section.
Figure 7:
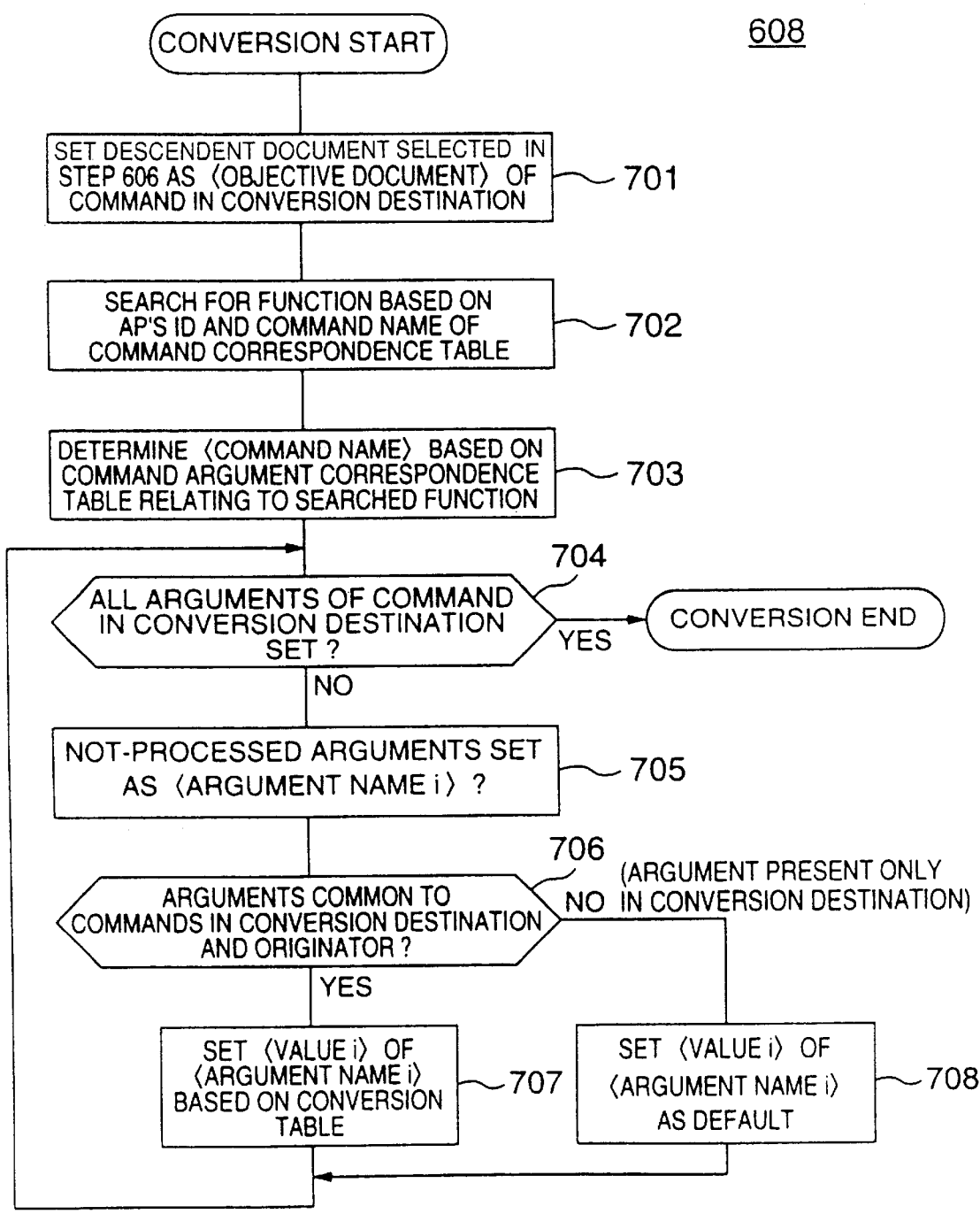
FIG. 7 shows details of a part in the flowchart of FIG. 6.
Figure 8:
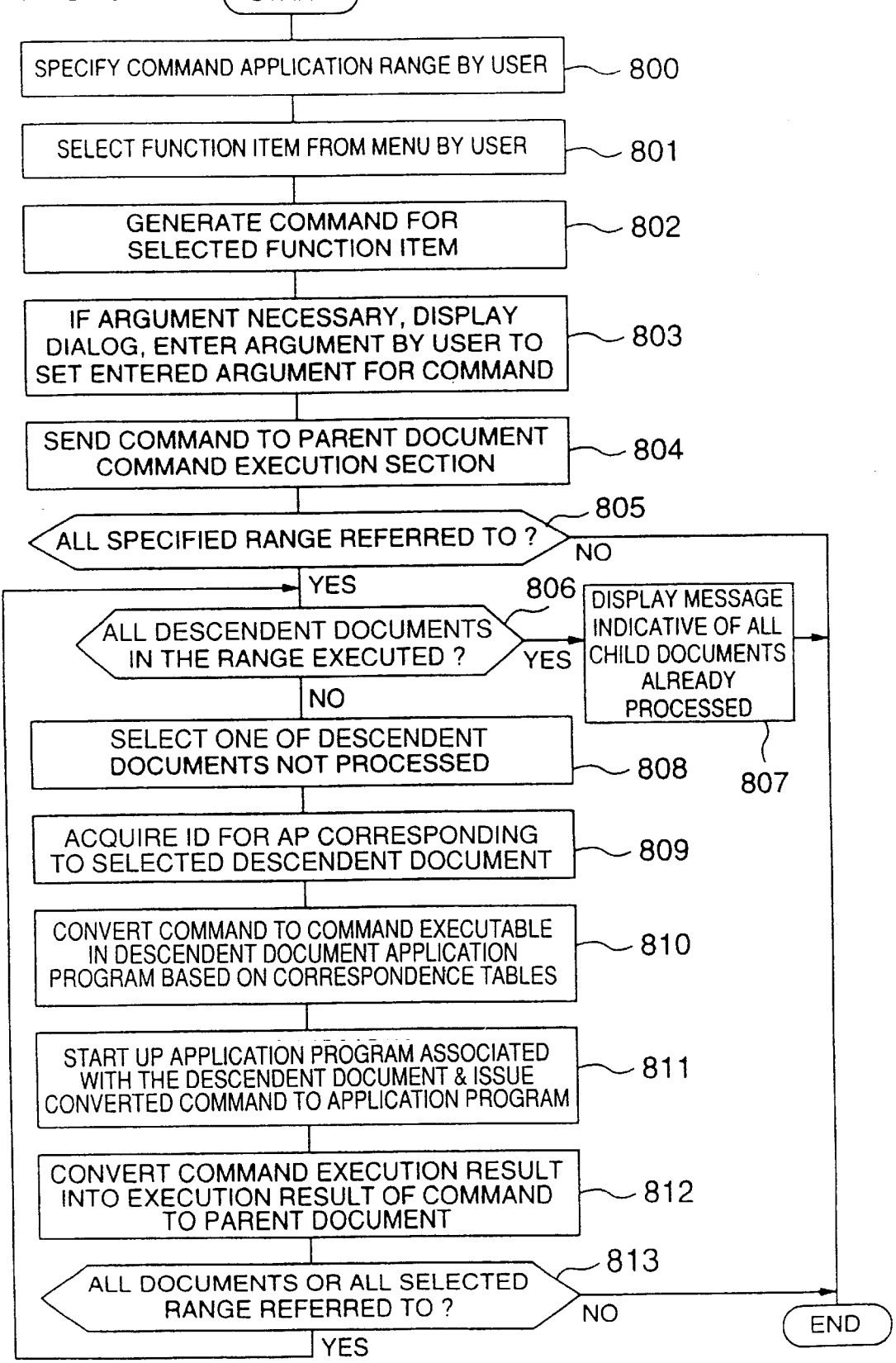
FIG. 8 is a second example of the flowchart showing flows of processing operations in the command input/conversion section.
Figure 9:
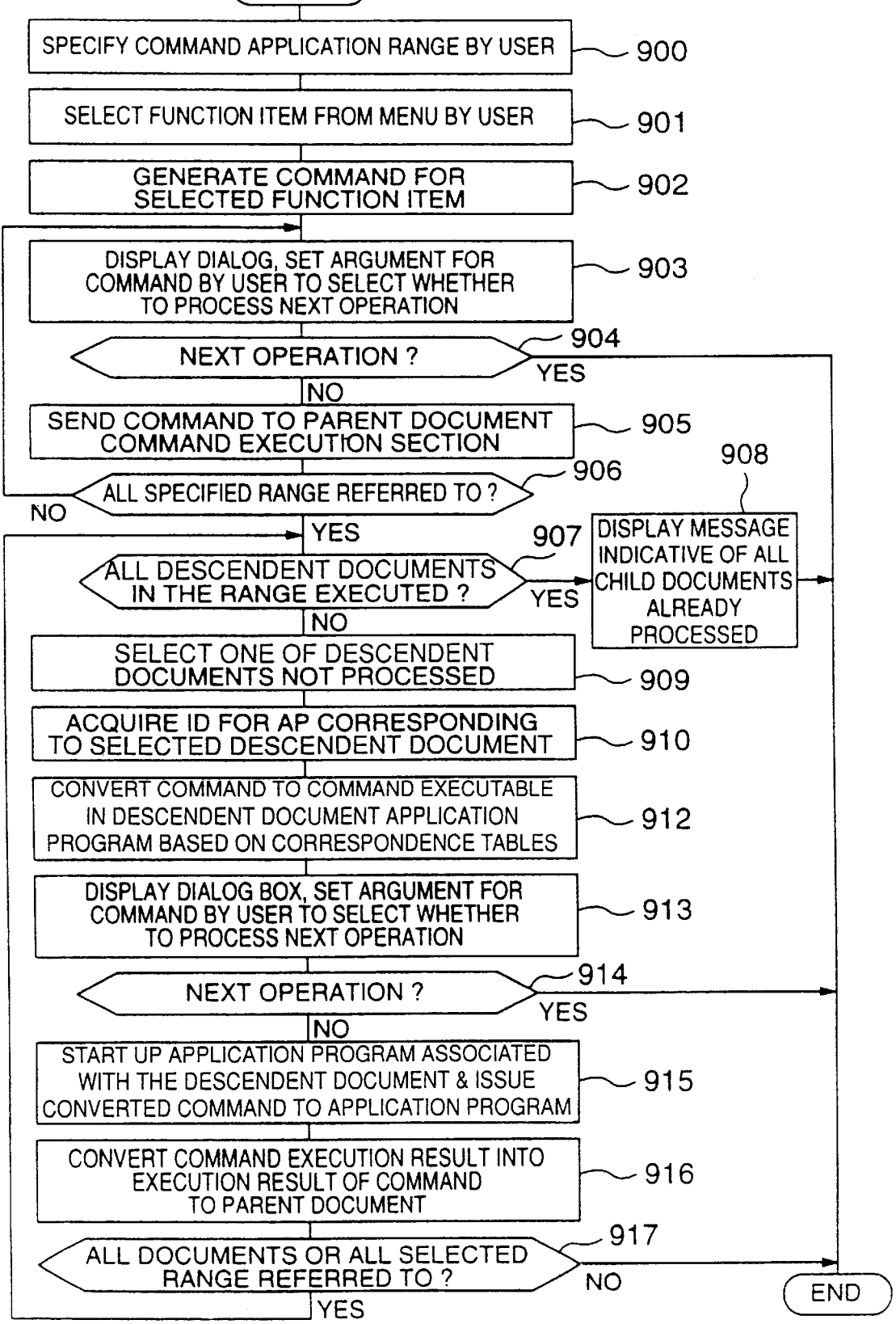
FIG. 9 is a third example of the flowchart showing flows of operations in the command input/conversion section.

FIG. 6 is a flowchart for explaining flows of the processing operations of the command input/conversion section 102 when a type A of command is executed, and FIG. 7 shows details of a step 608 in FIG. 6. Further, FIG. 8 is a flowchart for explaining flows of the processing operations of the command input/conversion section 102 when a type B of command is only once executed (type B-1), and FIG. 9 is a flowchart for explaining flows of the processing operations of the command input/conversion section 102 when a type B of command is repetively executed (type B-n). Based on the command type given in the row 0-1 of the table 108 of FIG. 4, any of the processing operations of FIG. 6, 8 or 9 is executed.

Explanation will then be detailed as to the operations of the command input/conversion section in the case of a type A command with use of FIGS. 1 to 3 and FIG. 6.

In this connection, this type of command is issued in the form of a format <target document>, <command name> (<argument name 1>=<value 1>, <argument name 2>=<value 2>, . . . <argument name n>=<value n>).

First, a user specifies an application range of the command with use of the keyboard 204 or mouse 205 (step 600). Then the user selects a function item from a menu of an application program displayed on the display 203 with use of the keyboard 204 or mouse 205 (step 601). This causes a command corresponding to the selected function item to be generated (step 602).

In this case, a parent document is used as the <objective document> and the command corresponding to the selected function item of the parent document is used as the <command name>. Next, when an argument is required in order to execute the command, a dialog box is displayed on the display 203. The user enters the argument using the keyboard 204 or mouse 205. The entered argument (<argument i>) and its value (<value i>) are set for the command generated at the step 602 (step 603), and the generated command is sent to the command execution section 103 (step 604). This results in that the command execution section 103 executes the command to process the document data 303 of the parent document.

Subsequently, based on the child document list 304 contained in the document 301 of FIG. 3, the following processing operations are carried out over all descendent documents. That is, when the operations are completed over all the descendent documents within the application range specified in the step 600 (step 605), the operations are finished. When there still remain descendent documents not processed yet (step 605), the system selects one of the not-processed descendent documents (step 606) to acquire the application program ID 302 of the selected descendent document (step 607). Based on the command correspondence table 108 and command argument correspondence table 109, the system converts the command having the argument set in the step 603 into a command executable for the descendent document application program (step 608).

Then the system starts up the descendent document application program and sends the converted command to the command execution section of the descendent document application program (step 609). This causes the command execution section of the descendent document application program to execute the converted command to process the document data 303 of the descendent document. In the step 605, all the descendent documents are obtained by sequentially following the document list in the following manner. That is, a child document is obtained from the child document list 304 and a child document (i.e., descendent document) of the obtained child document from the list of the child documents (i.e., descendent documents) of the child document.

Detailed explanation will next be made as to the step 608 in FIG. 6 with use of FIGS. 4, 5 and 7. FIG. 7 is a flowchart of processing operations when the command conversion is carried out from the command of the parent document application program to the command of the descendent document application program.

First, the system uses the descendent document selected in the step 606 as the <target document> of the converted command (step 701). In the command correspondence table 108, next, the system searches the parent document application program ID row for the command name of the command generated in the step 602. The system searches the row 0 for the function present in the same column as the searched command (step 702).

Subsequently, the system searches the command argument correspondence table 109 of the searched function for a command for performing the function searched by the descendent document application program. The searched command is used as the <command name> of the converted command (step 703).

The following operations are then repeated until all arguments of the converted command are set. After setting all the arguments of the converted command (step 704), the system terminates its operation. When there remain the arguments of the converted command not set yet (step 704), the system selects one of the not-processed arguments and sets its argument name as the <argument i> (step 705). Whether or not the argument corresponding to <argument i> is present also in the original command is judged by whether or not the argument name is described in the same row of the command argument correspondence table. When determining the presence of the argument name description as a result of the judgement (step 706), the system uses the argument name as the argument name in the converted command. The system further uses the value present in the same row as the argument value of the original command in the command argument correspondence table, as the value of the argument of the converted command (step 707), and returns to the step 704. In the presence of the argument present only in the conversion destination, the system sets the argument value as its default value (the value of the row n-1) (step 708) and returns to the step 704.

Explanation will next be made as to flows of processing operations when a command of the type B is executed only once (type B-1), by referring to FIG. 8. In the drawing, steps 800 to 804 correspond in operation to the steps 600 to 604 in FIG. 6 respectively. Further, a step 806 corresponds to the step 605 in FIG. 6, and steps 808 to 811 correspond to the steps 606 to 609 in FIG. 6, respectively.

Only parts in FIG. 8 different from those in FIG. 6 will be explained below. In a step 805, the system judges on the basis of the return value of the command whether or not the parent document data was referred to as far as the last of the specified application range. When the application range is referred to as far as the last, this means the completion of the operations for the parent document. Accordingly the system proceeds to the step 806 to perform the following operations over the descendent documents. When the application range is not fully referred to, on the other hand, this means completion of once execution, thus terminating the operation. In a step 807, the system displays a message indicative of the fact that the command was executed for the parent document and all the descendent documents. In a step 812, the system converts a result (command return value) of the command execution performed in a step 811 into a return value of the parent document application program on the basis of the command argument correspondence table 109. In other words, the system searches the command argument correspondence table 109 for the return value of the command for the child document, and converts the searched return value into a return value of the parent document command present in the same row as the searched value. In a step 813, as in the step 805, the system judges on the basis of the return value of the command whether or not the specified range was referred to as far as the last. The determination of failure of the reference as far as the last as the judgement result causes the system to terminate the operation. The determination of success of the reference as far as the last causes the system to return to the step 806. This is because it means the completion of the operations over the descendent document.

Explanation will then be made in connection with FIG. 9 as to flows of processing operations when a command of the type B is repetitively executed (type B-n). The flowchart of FIG. 9 is similar to that of FIG. 8, so only differences therebetween will be explained below.

The differences of the flowchart of FIG. 9 from the flowchart of FIG. 8 are (1) a user enters a command indicative of whether to continue the operation at steps 903 and 913, (2) the system judges in steps 904 and 914 whether to continue the operation and when determining not to continue the operation, the system terminates the operation, and (3) when failing to refer to an entire document or a full range in step 906 and 917, the system returns to steps 903 and 913 respectively.

Explanation will next be made as to which part of the command is converted in which step. Explanation will be directed, e.g., to a case where the document 2 of the spreadsheet program 1 is embedded into the document 1 of the word processor program as an example. In this case, conversion is carried out between the following commands as an example. That is, 'document 1.EditFind(Find= "patent", Direction=0, MatchCase=1, MatchByte=0)' is converted to [document 2.Find (what="patent", direction=Next, matchCase=TRUE, searchOrder=ByRow)].

In this case, the first command means 'to search the document 1 of the word processor program 1 for a character string "patent" in the next direction while drawing a distinction between upper and lower cases and while not drawing a distinction between single and double byte characters'. The next command is a command usable for the spreadsheet program 1.

The <target document> described as the document 2 herein is a document selected in the step 606, 808 or 909. The <command name> described as 'Find' is determined in the step 703. The values of arguments 'what', 'direction' and 'matchCase' are determined in the step 707 because the corresponding arguments 'Find', 'Direction' and 'Match-Case' are present in the conversion originator. The argument 'searchorder' is present only in the converted command; a default (row 8-1 in FIG. 5) in the step 708 is employed as its argument value. Further, the argument 'MatchByte' of the word processor program 1 is absent in the command of the spreadsheet program 1 and thus ignored.

The operation of the command registration section 104 will be explained with reference to the drawings. FIG. 10 shows the command correspondence table 110 for a specific application program. FIG. 11 shows the command argument correspondence tables 111 for the specific application program. FIG. 10 shows an example when a drawing program 1 is used as the application program having an application program ID of 'drawing 1', and FIG. 11 shows an example when a command 'FindString' for the drawing program 1 is described as one example.

Figure 12:
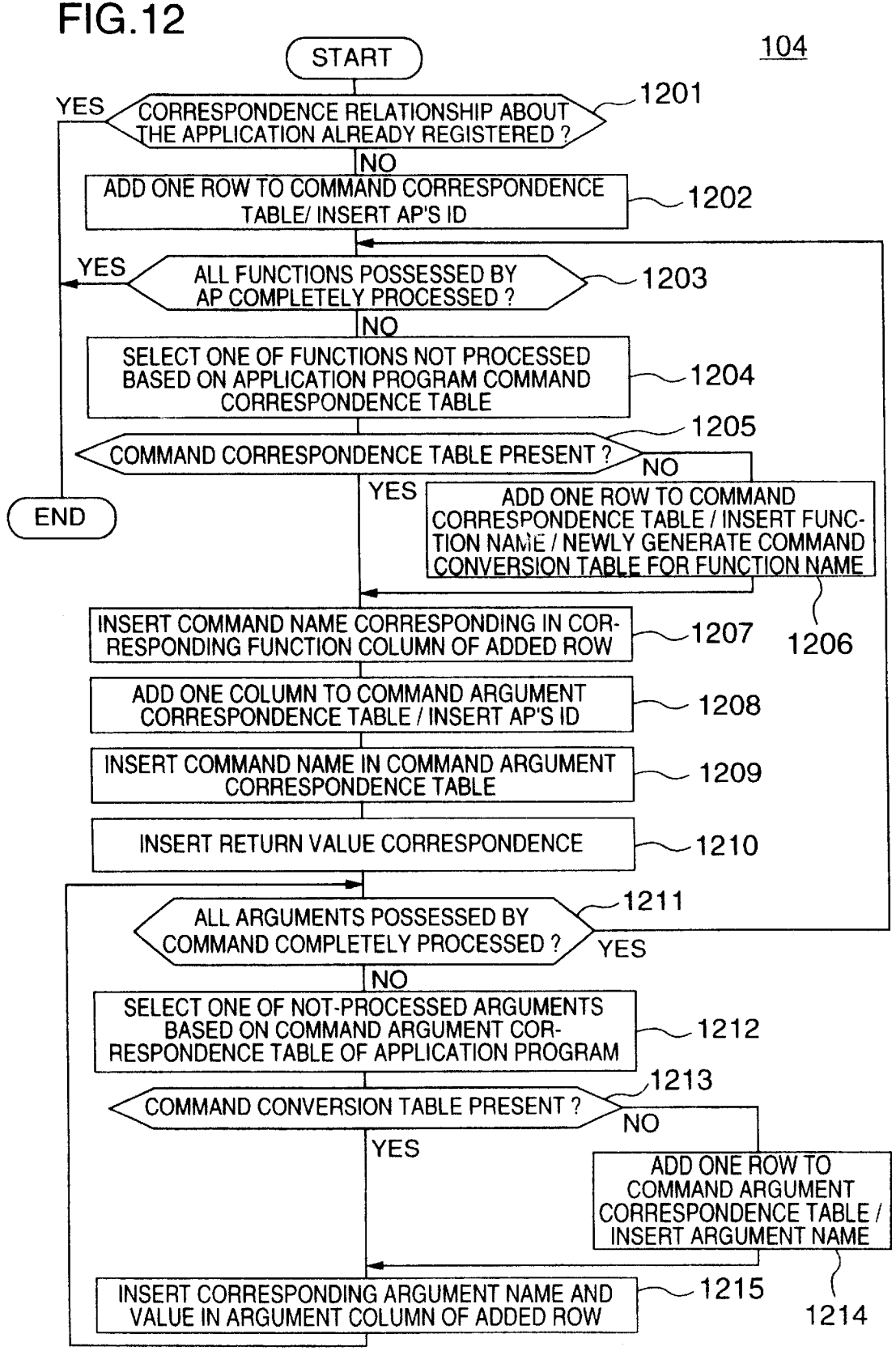
FIG. 12 is a first example of a flowchart for explaining the processing operation of a command registration section.

FIG. 12 shows a flowchart of flows of processing operations when the command correspondence table 108 and command argument correspondence table 109 of the command registration section 104 are updated on the basis of the corresponding tables 110 and 111 of the application program. This operation is executed before the command input/conversion section 102 executes the operations of FIGS. 6 to 9.

The command registration section 104 is executed in the following cases, that is, when an application program is installed, when the application program is started up, and when a document prepared with use of the application program is embedded into another document.

Next, the flowchart of FIG. 12 will be explained in detail. The system first judges whether or not an application program ID being about to be registered in the command correspondence table 108 is already present therein (1201). At this time, if the ID is already registered, then the system terminates the operation. If the ID is not registered yet, then the system adds one row to the command correspondence table 108 and inserts the application program ID in the command correspondence table 110 of the application programs into the added row of the command correspondence table 108 (step 1202).

Next, the following operations are repeated over all the functions in the command correspondence table of the application program. In other words, the system judges the completion or non-completion of the operations over all the functions (step 1203). When determining the completion of all the functions as its judgement result, the system terminates the operation. When there are functions that have as not been processed yet, the system selects one of the not-processed functions (step 1204) and judges whether or not the selected function is present in the command correspondence table 108 (step 1205). In the absence of the function in the command correspondence table, the system adds a new row to the command correspondence table and inserts the name of the selected function into the added row, and the system newly creates a command argument correspondence table 109 concerning the function (step 1206).

The system then inserts the command name associated with the selected command in the command correspondence table 110 into a corresponding functional column of the row added in the step 1202 (step 1207).

Subsequently, the following operations are carried out over the command argument correspondence table 109 relating to the selected function. That is, the system first adds one column to the command argument correspondence table 109 and inserts the ID of the application program into the added column (step 1208). The system inserts the command name in the command argument correspondence table 111 into the column added in the command argument correspondence table 109 (step 1209). In this case, when a return value is defined for the table 111, the system inserts its contents into the column of the return value of the table 109 (step 1210). The following operation is repeated over all the arguments in the table 111. When completing the operation of all the arguments in the table 111 (step 1211), the system returns to the step 1203 because the updating of the table relating to the function in processing operation is completed. When there still remain arguments not processed yet, the system selects one of the arguments from the table 111 (step 1212), and judges whether or not the argument is present in the command argument correspondence table 109 (step 1213). When the judgement result is the absence of the argument in the table, the system adds a new row to the command argument correspondence table 109 and inserts the name of the selecting argument and the meaning of the argument into the added row (step 1214).

Next, the system copies the argument name and value to the argument row corresponding to the added column from the table 111 (step 1215) and then returns to the step 1211.

Although it has been assumed in the present embodiment that the argument of a command has an argument name, the present invention is valid even when otherwise. For example, the present invention is valid even for such a command system that the meanings of arguments are determined by the order of the arguments placed, as in a command system having no argument name as (<objective document>.<command name><value 1>,<value 2>, . . . ,<value n>). In this case, in place of the argument name, the sequence of the argument placed in the order is described in the command argument correspondence table, thereby enabling the command conversion.

In accordance with the present embodiment, the need for conducting troublesome operations by the user can be eliminated at the time of starting up or installing an application program. Even when it is desired for the command registration section to update the command correspondence table and command argument correspondence table, the user can avoid the need for conducting troublesome operations.

Explanation will then be made as to a second embodiment of the present invention with reference to the accompanying drawings. In the second embodiment, the system displays a list of commands or arguments, while the user selects a desired one of the commands or arguments from the displayed list to register the selected command or argument in the command correspondence table or command argument correspondence table.

Figure 13:
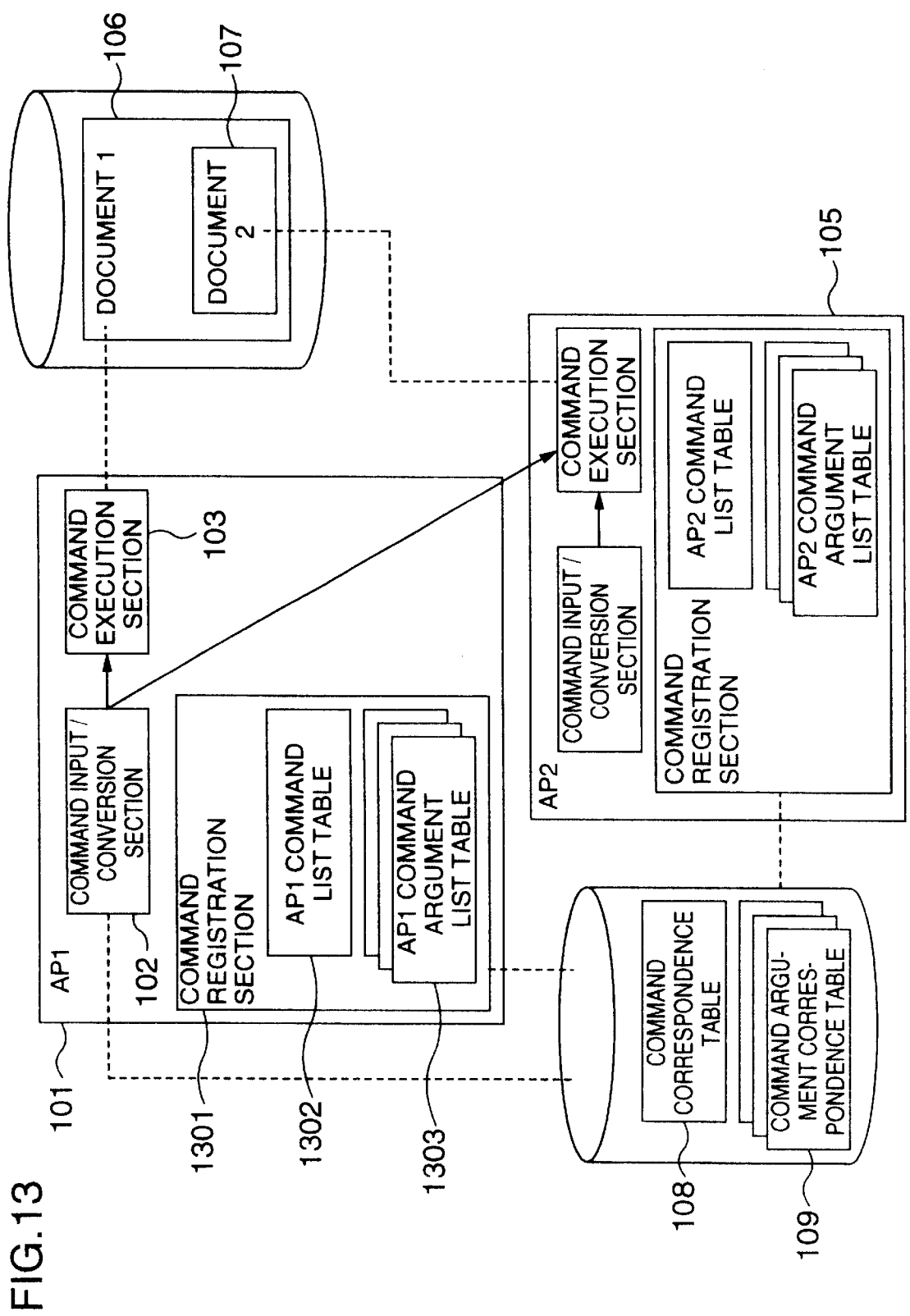
FIG. 13 is a second example of the software arrangement of the present invention.

FIG. 13 shows a second embodiment of the software arrangement of the present invention. Explanation will be made in connection with a case where a compound document corresponding to a combination of the document 1 (106) and the document 2 (107) embedded into the document 1 is processed. The arrangement of FIG. 13 is similar to that of FIG. 1, except that a command registration section 1301 is provided in FIG. 13. In FIG. 13, the command registration section has a command list table 1302. The command list table 1302 corresponds to the command correspondence table 110 for each application program in FIG. 1. The command registration section 1301 also has a command argument list table 1303. The command argument list table corresponds to the command argument correspondence table 111 for each application program in FIG. 1.

Figure 14A:
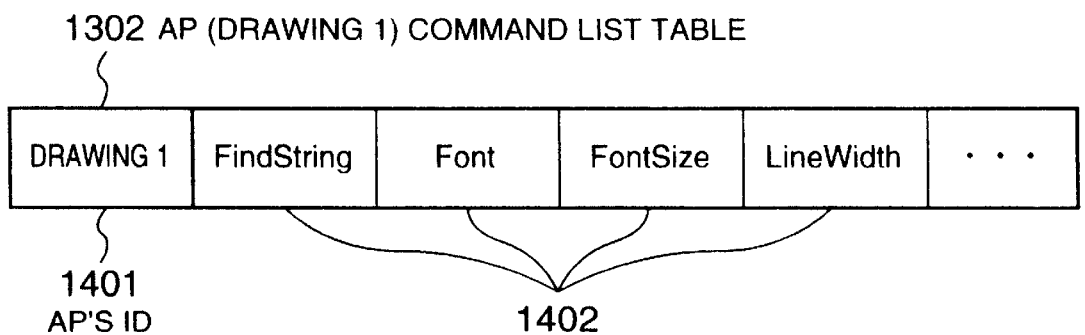
FIG. 14A shows a command list table.
Figure 14B:
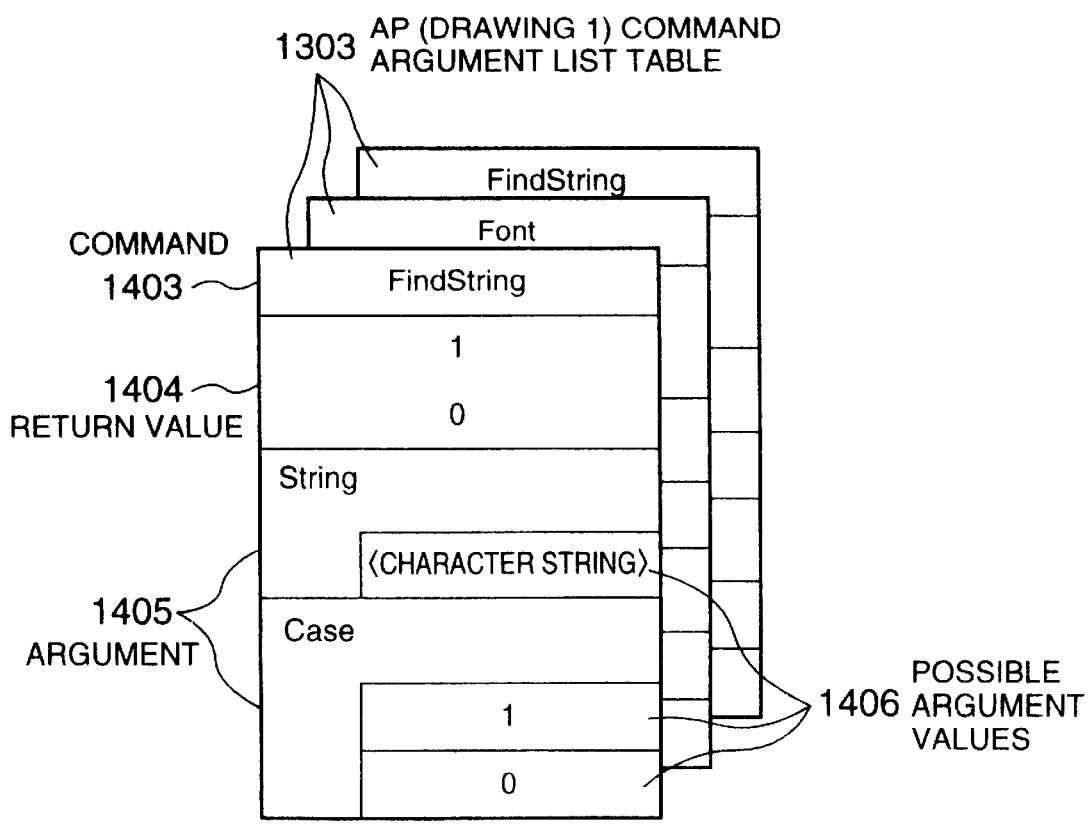
FIG. 14B is a command argument list table.

FIGS. 14A and 14B show the command list table 1302 of a specific application program and the command argument list tables 1303 relating to specific functions of the application program, respectively. FIG. 14B shows in its front the command argument list table 1303 relating to the command 'FindString' of the application program having an application program ID of 'drawing 1'.

Figure 15:
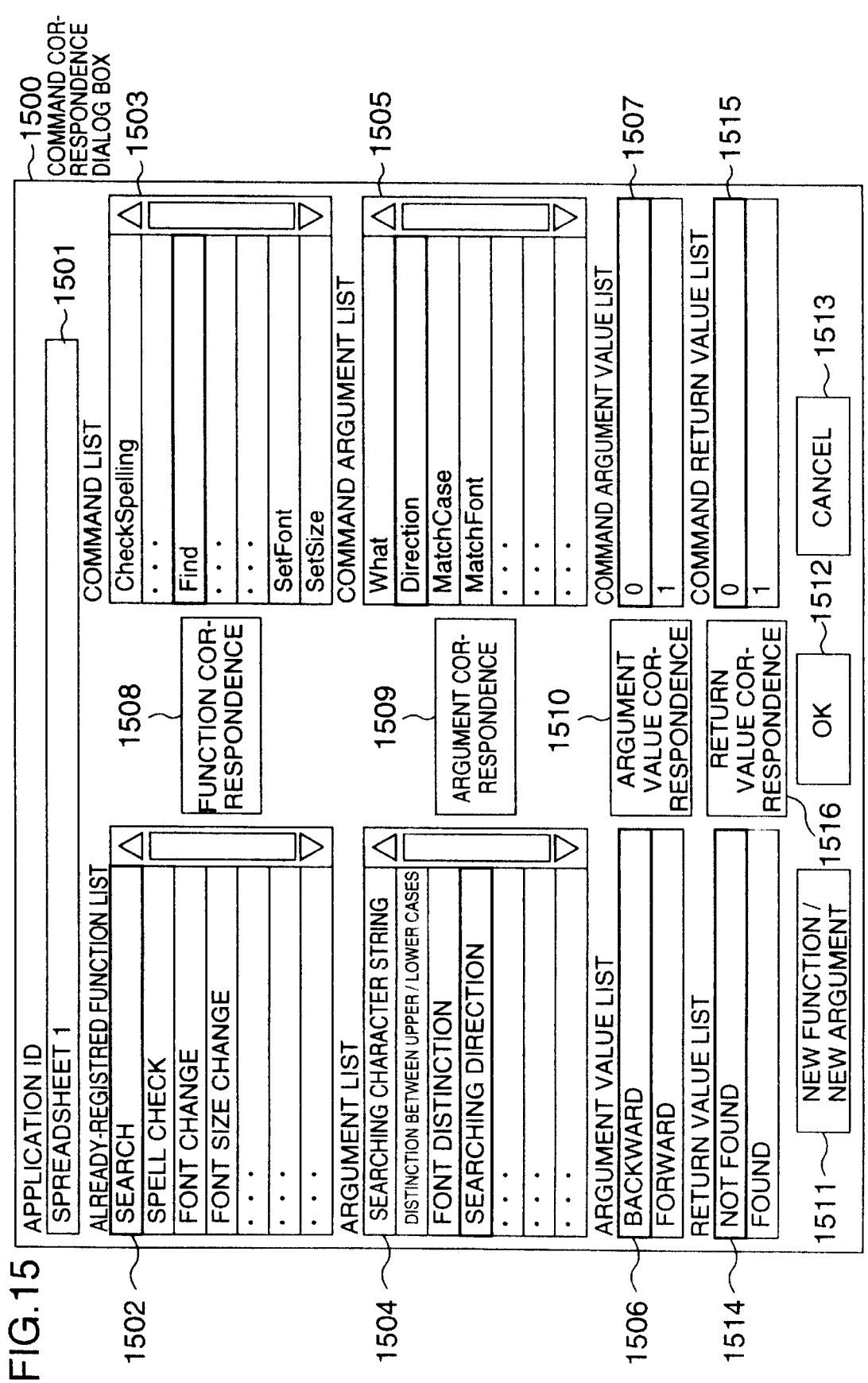
FIG. 15 is a first example of a command correspondence dialog box.
Figure 16:
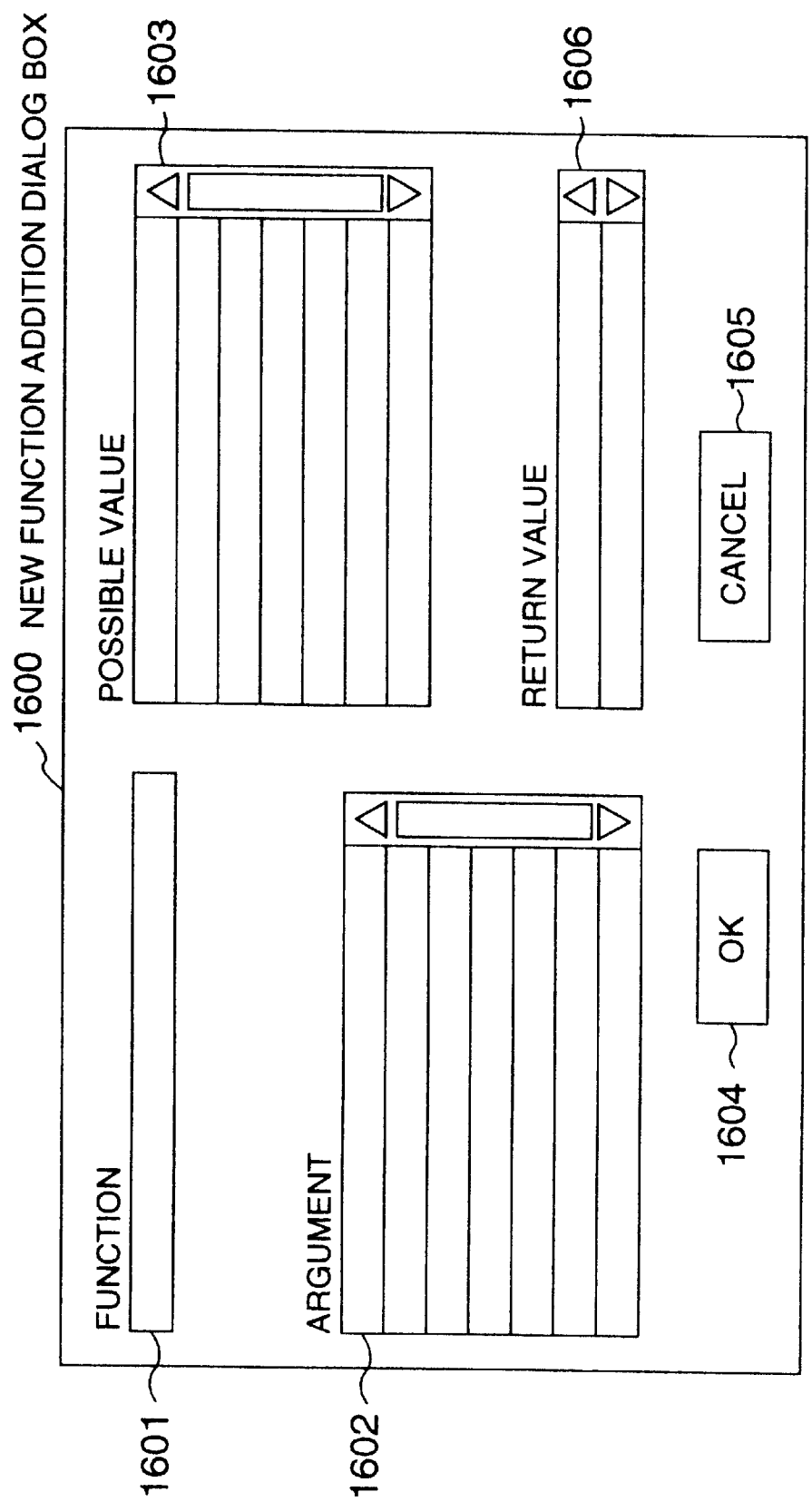
FIG. 16 shows a new function additional dialog box.

Shown in FIGS. 15 and 16 are screen configuration examples of a command correspondence dialog box 1500 and a new-function addition dialog box 1600, respectively. These boxes are for displaying a command on the display 203 at the time of registering the command and for accepting an input from the user.

The command correspondence dialog box 1500 of FIG. 15 includes, as its constituent elements, a zone 1501 for displaying an application program ID, an already-registered function list display zone 1502 for displaying a list of functions already registered, a command list display zone 1503 for displaying a list of commands usable for the application program, an argument list display zone 1504 for displaying a list of arguments of the function selected at the zone 1502, a command argument list display zone 1505 for displaying a list of arguments of the command selected at the zone 1503, an argument value list display zone 1506 for displaying a list of meanings of possible values of the arguments selected at the zone 1504, a command argument value list display zone 1507 for displaying the possible values of the arguments selected at the zone 1505, a return value list display zone 1514 for displaying a list of return values of the function selected at the zone 1502, a command return value list display zone 1515 for displaying a list of return values of the command selected at the zone 1503, a function correspondence button 1508, an argument correspondence button 1509, an argument value correspondence button 1510, a return value correspondence button 1516, a new-function/new-argument button 1511, an OK button 1512, and a CANCEL button 1513.

FIG. 16 shows the new-function addition dialog box 1600. The illustrated new-function addition dialog box 1600 includes, as its constituent elements, a text input zone 1601 for inputting a function name, a zone 1602 for displaying a list of text zones for input of the argument name of the function inputted at the zone 1601, a zone 1603 for displaying a list of text zones for input of the meanings of possible values of the arguments selected at the zone 1602, an OK button 1604, and a CANCEL button 1605.

Figure 17B:
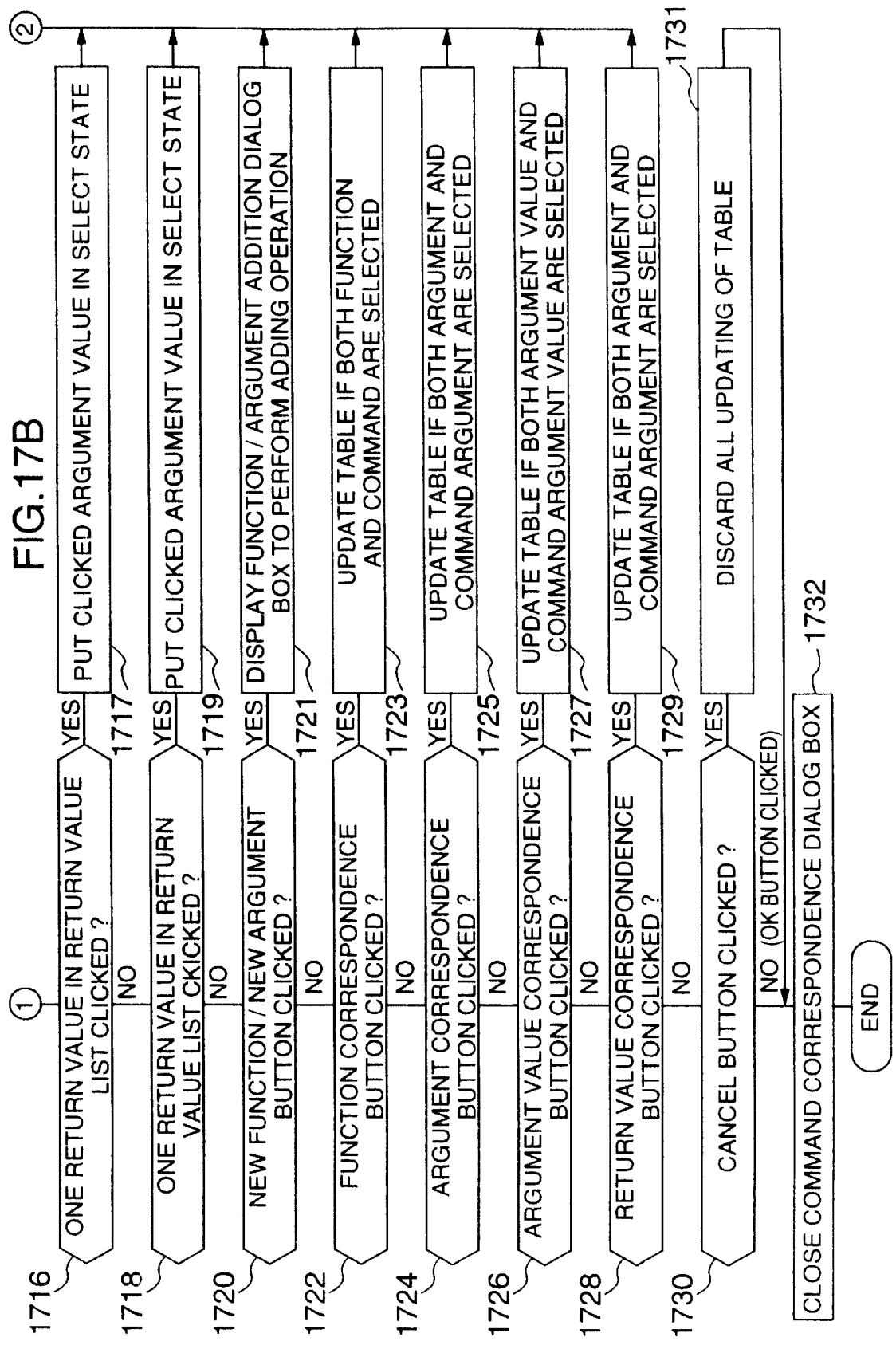
Figure 18:
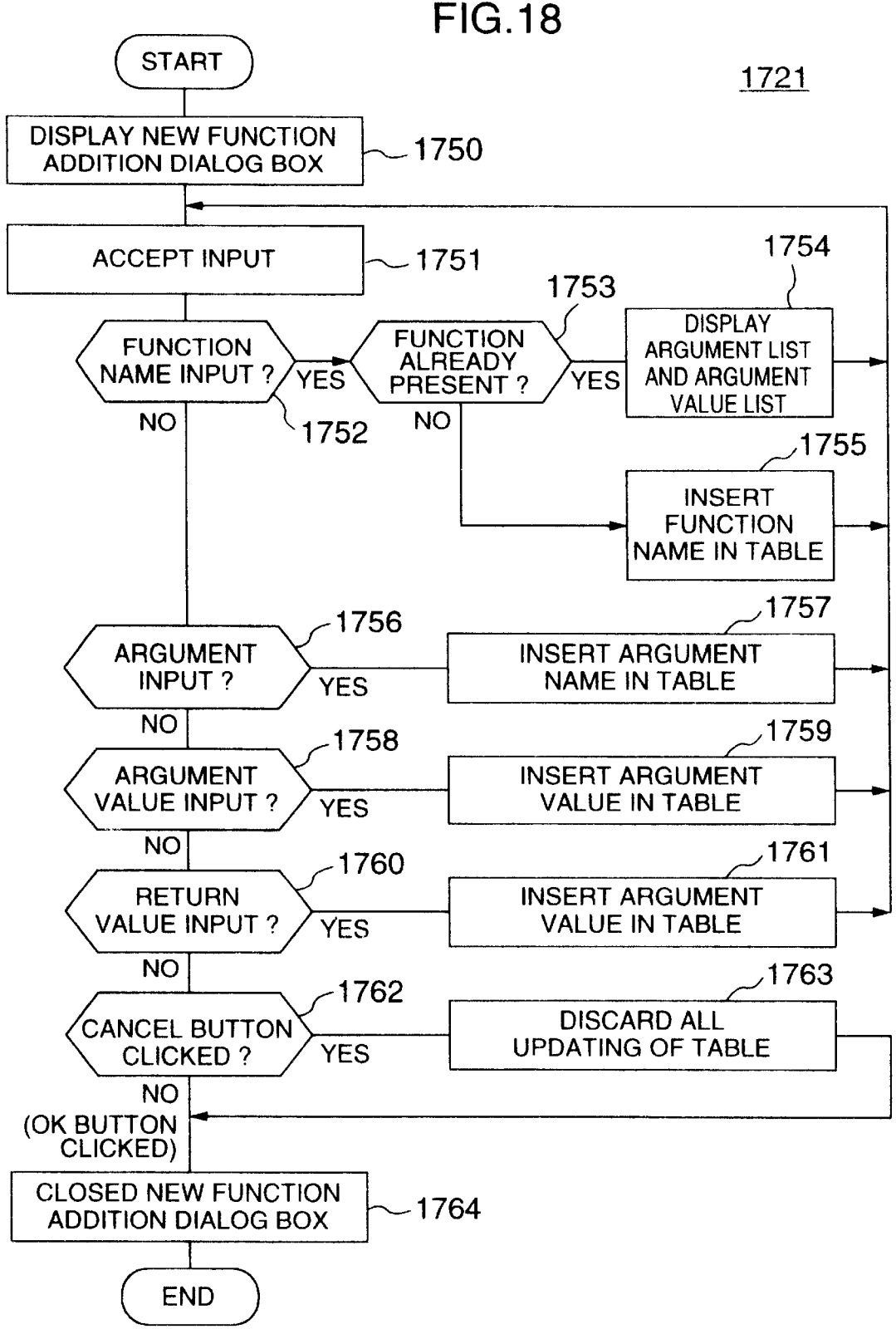
FIG. 18 is a third example of the flowchart of the processing operations of the command registration section.

FIG. 17 is a flowchart for explaining flows of processing operations of the command registration section 1301 in a command registration mode. FIG. 18 is a flowchart for explaining flows of processing operations when the new-function/new-argument button 1511 in FIG. 15 is pushed, that is, for explaining details of a step 1721 in FIG. 17.

The details of the processing operation of the present invention in the command registration mode will be explained in detail with reference to FIG. 17. The system first displays the command correspondence dialog box 1500 (step 1701). That is, an application program ID 1401 in the command list table 1302 of the application program is displayed on the zone 1501. Further, all command names 1402 are displayed on the zone 1503, and all the functions in the row 0 of the command correspondence table 108 are also displayed on the zone 1502. Now one row is inserted into the command correspondence table 108 and the application program ID 1401 is inserted into the column 0 of the added row (step 1702). Further, the system accepts an input (step 1703) and performs the following operations in response to the input.

That is, when the user clicks one of the functions in the already-registered function list 1502 (step 1704), the system puts the clicked function in its select state. The system displays all argument names in the command argument correspondence table 109 of the function put in the select state on the zone 1504 in the form of a list. Simultaneously, the system displays return values on the zone 1514 in the form of a list (step 1705). The user's click of one of the commands in the command list 1503 (step 1706) causes the system to perform the following operations. That is, the system puts the clicked command in its select state. The system displays, in the form of a list, the arguments 1405 of the select-state command in the command argument list table 1303 on the zone 1505. Simultaneously, the system displays the return values 1404 on the zone 1515 in the form of a list (step 1707). Further, the user's click of one of the arguments in the argument list 1504 (step 1708) causes the system to perform the following operations. That is, the system puts the clicked argument in its select state and displays a list of possible values of the argument in the command argument correspondence table 109 (step 1709).

The user's click of one of the arguments in the command argument list 1505 (step 1710) causes the system to perform the following operations. That is, the system puts the clicked argument in its select state and displays a list of possible values of the argument in the command argument list table 1303 (step 1711). the user's click of one of the argument values in the argument value list 1506 (step 1712) causes the system to put the clicked argument value in its select state (step 1713). The user's click of one of the argument values in the command argument value list 1507 (step 1714) causes the system to put the clicked argument value in its select state (step 1715). The user's click of one of the return values in the return value list 1514 (step 1716) causes the system to put the clicked return value in its select state (step 1717). The user's click of one of the return values in the command return value list 1515 (step 1718) causes the system to put the clicked return value in its select state (step 1719). The user's click of the new-function/new-argument button 1511 (step 1720) causes the system to display the new-function addition dialog box 1600 and perform its additional operation (step 1721).

Further, when the user clicks the function correspondence button (step 1722) and when both of the function and command are already selected, the system inserts the selected command name into the column of the selected function in the command correspondence table 108, and the system adds one column to the command argument correspondence table 109 of the selected function and inserts the application program ID into the row 0 (step 1723).

When the user clicks the argument correspondence button (step 1724) and when both of the argument and command argument are already selected, the system inserts the selected command argument into the row of the selected argument in the command argument correspondence table 109 (step 1725). When the user clicks the argument value correspondence button (step 1726) and when both of the argument value and command argument value are already selected, the system inserts the following command value, that is, the argument value of the selected command into the row of the selected argument value in the command argument correspondence table (step 1727). The user's click of the return value correspondence button (step 1728) causes the system to perform the following operation. That is, when the return value and command return value are both already selected, the system updates the table. In other words, the system inserts the return value of the selected command into the row of the selected return value in the command argument correspondence table 109 (step 1729).

The user's click of the CANCEL button (step 1730) causes the system to wholly discard the updating of the table (step 1731). So long as the CANCEL button (or OK button) is not clicked, the system completes its operation and then returns to the step 1703. The user's click of the CANCEL button or OK button causes the system to close the command correspondence dialog box (step 1732) and terminate the operation.

Details of the step 1721 will be explained with use of FIG. 18. The system first displays the new-function addition dialog box 1600 (step 1750) to accept an input (step 1751). The input causes the system to perform the following operations.

That is, the user's input of a function name to the zone 1601 (step 1752) causes the system to judge whether or not the input function is already present in the command correspondence table 108 (step 1753). When determining the already presence of the input function as its judgement result, the system displays lists of arguments, argument values and return values in the command argument correspondence table 109 of the function on the zones 1602, 1603 and 1606 respectively (step 1754). Otherwise, the system adds one column to the command correspondence table 108, inserts the input function name into the row 0, and generates a new command argument correspondence table 109 of the function (step 1755). The user's input of an argument to the zone 1602 (step 1756) causes the system to add a row of the argument to the command argument correspondence table 109 (step 1757).

Input of a possible argument value to the zone 1603 (step 1758) causes the system to add a row of the argument value to the command argument correspondence table 109 (step 1759). Then input of a return value to the zone 1606 (step 1760) causes the system to add a row of the return value to the command argument correspondence table 109 (step 1761). After completing the above processing operation, the system returns to the step 1801. The user's click of the CANCEL button (step 1762) causes the system to wholly discard the updating and new preparation of a table (step 1763) and to close the new-function addition dialog box (step 1764) to terminate the operation. The user's click of the OK button causes the system to close the new-function addition dialog box as it is and terminate the operation.

In the present embodiment, the system displays the commands and command arguments of the application program in the form of such lists as shown in FIG. 15. Though such display enables the user to select the commands or their arguments, the system may display a menu or a dialog box possessed by the application program in place of the above lists to allow the user to select them. A structure of a command correspondence dialog box in the latter case is shown in FIG. 19, and tables required therefor are shown in FIGS. 20A, 20B and 20C.

Figure 19:
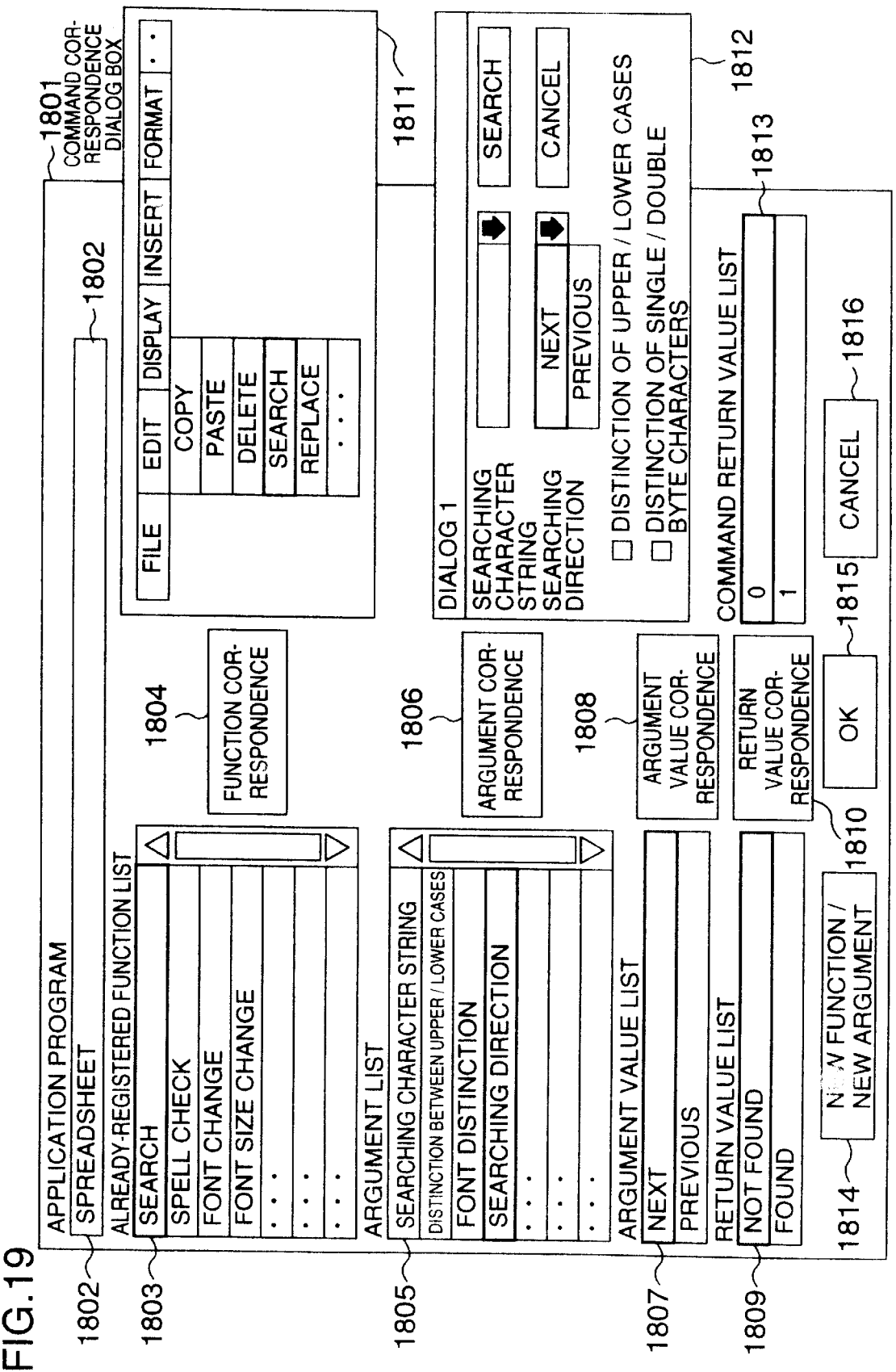
FIG. 19 is a second example of the command correspondence dialog box.

Zones 1802, 1803, 1805, 1807, 1809, 1813, 1804, 1806, 1808, 1810, 1814, 1815, and 1816 in FIG. 19 are similar in structure to the zones 1501, 1502, 1504, 1506, 1514, 1507, 1508, 1509, 1510, 1516, 1511, 1512, and 1513 in FIG. 15, respectively.

A zone 1811 is a menu display window for display of the menu of the application program. A zone 1812 is a dialog box display window for display of a dialog box for use of the menu item selected at the zone 1811.

Each dialog box has a plurality of constituent elements 1906, which is shown in FIGS. 20A, 20B and 20C. Further, each constituent element has an identifier 1907 for distinguishing it from the other constituent elements.

In FIGS. 20A, 20B and 20C, reference numeral 1901 denotes a menu command correspondence table which shows a correspondence relationship among application program menu items 1902, dialog box identifiers 1903 and commands 1904. Further, reference numeral 1908 denotes a dialog box/argument correspondence table which shows a correspondence relationship between constituent elements 1909 in the application program dialog box and command arguments 1910. When the constituent element is a list, the dialog box/argument correspondence table shows a correspondence relationship between the items of the list and possible argument values. When the constituent element is a check box, the dialog box/argument correspondence table shows a correspondence relationship between the state (presence or absence of check) of the check box and possible argument values.

The operation of the command registration section 1301 in the present embodiment is substantially the same as that of FIG. 17, but different therefrom in the following respects. That is, in the step 1702, the system displays a menu display window 1811 in place of displaying the command list. The menu contains the application program menu item 1902 in the menu command correspondence table 1901. In the judgement of the step 1706, the system judges whether or not the menu item was selected from the menu in the menu display window.

In the step 1707, in place of displaying the list of command arguments, the system displays a dialog box corresponding to the selected menu. The dialog box to be displayed is determined by the menu command correspondence table 1901.

In the step 1710, the system judges whether or not one of the constituent elements in the dialog box of a dialog box display window 1812 was operated. In the step 1711, in place of displaying a list of possible argument values, the system displays the state of the window after the operation of the constituent element. That is, when the state display is a list, the system displays an item selected in the list. When the state display is a check box, the system displays whether or not an item was checked. When the state display is a text box, the system displays whether or not an item is selected. The steps 1714 and 1715 are deleted. When it is desired to update the table in the step 1723, the command name is determined by the menu item selected in the zone 1811 and by the menu command correspondence table 1901. When it is desired to update the table in the steps 1725 and 1727, the argument name and value are determined by the state of the constituent element of the dialog box selected in the zone 1812 and by the dialog box/argument correspondence table 1908.

In the first embodiment, a user interface of the application program associated with the parent document also processes its descendent documents. However, the user interface may be changed according to the type of the descendent document.

Explanation will next be made as to an embodiment of the operation of the command input/conversion section 102 when the user interface is changed according to the type of the descendent document, with reference to the attached drawings.

Figure 21:
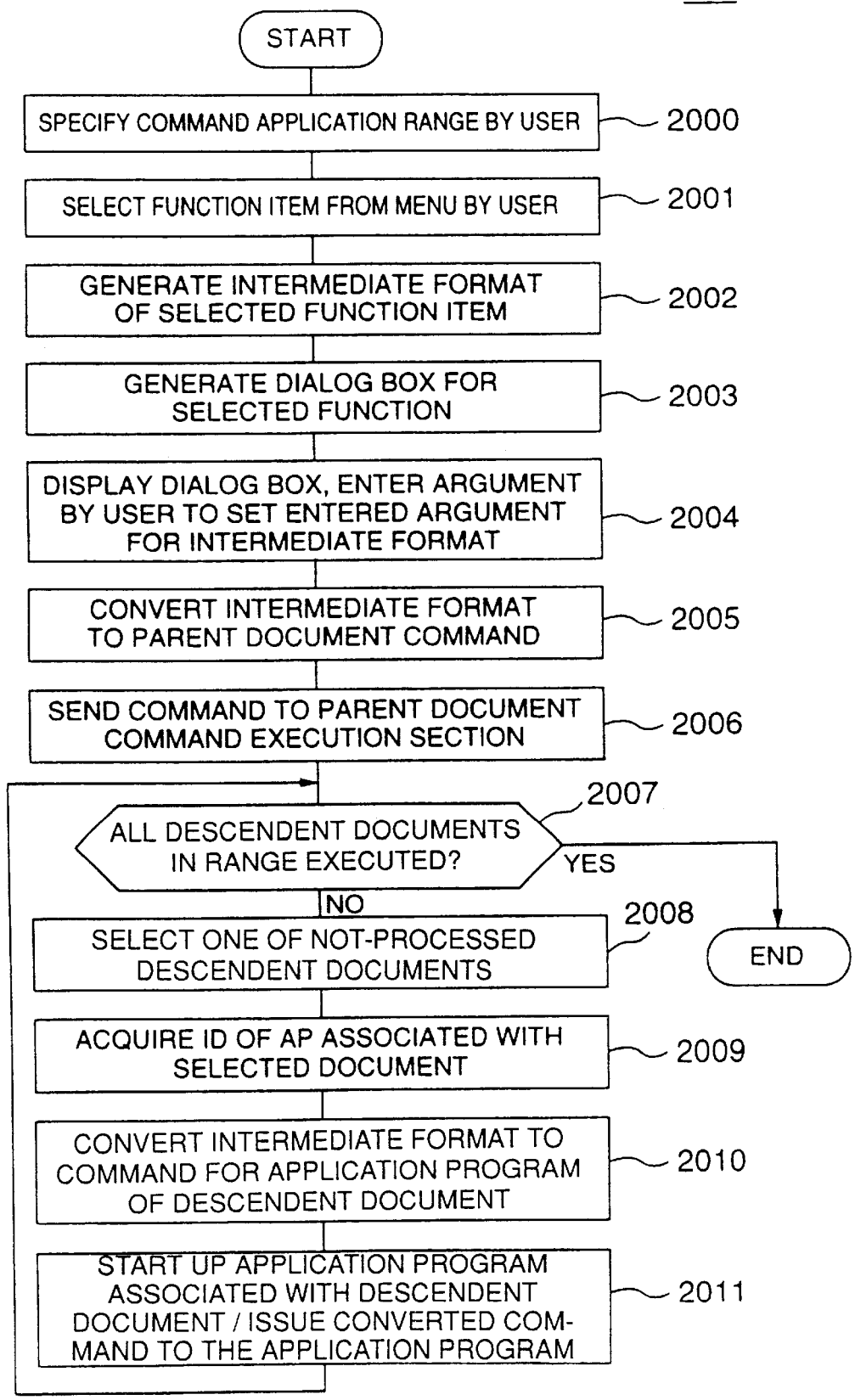
FIG. 21 is a fourth example of the flowchart of the processing operations of the command input/conversion section.
Figure 22:
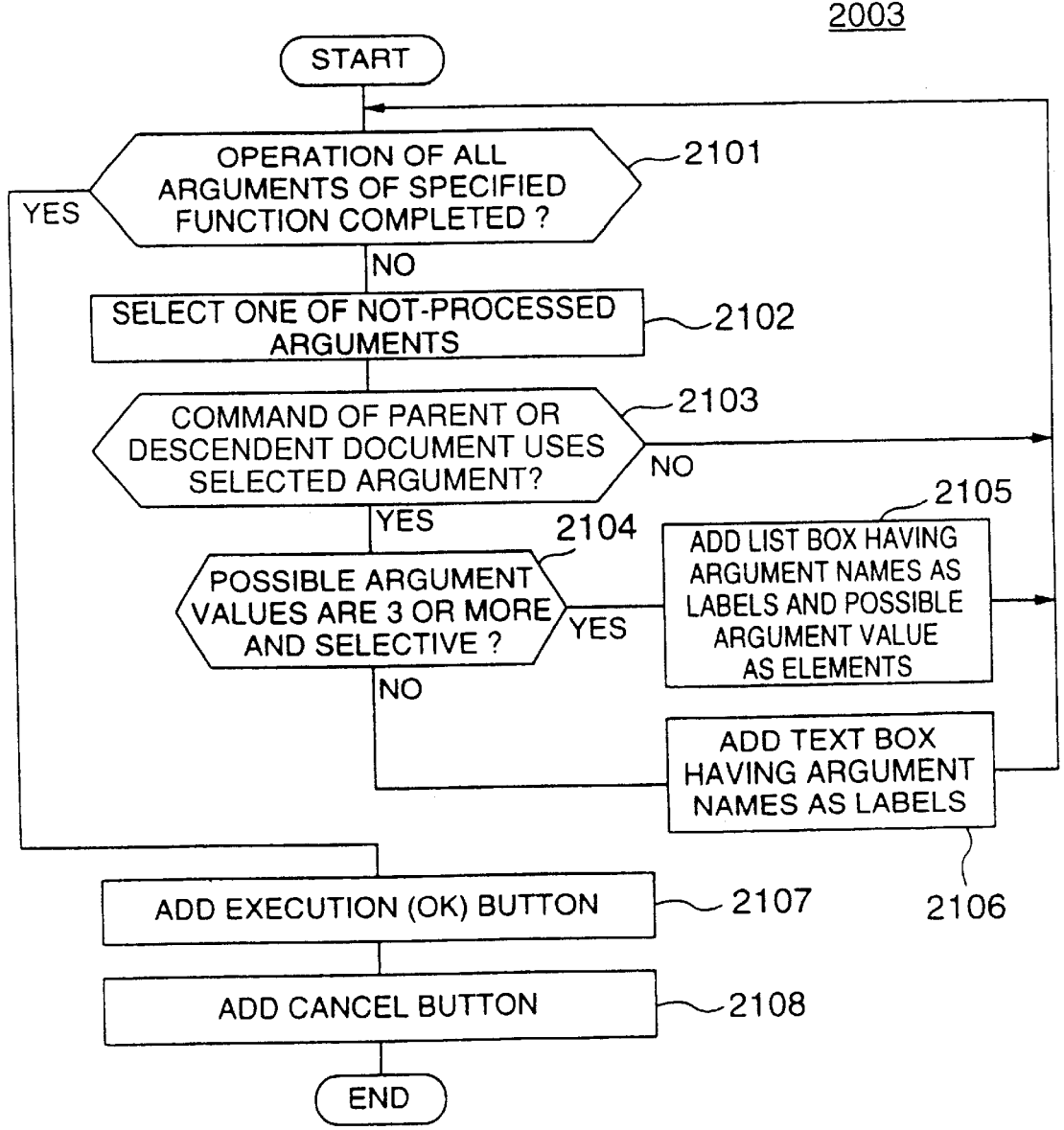
FIG. 22 shows details of a part in the fourth example of the flowchart of the processing operations of the command input/conversion section.
Figure 23:
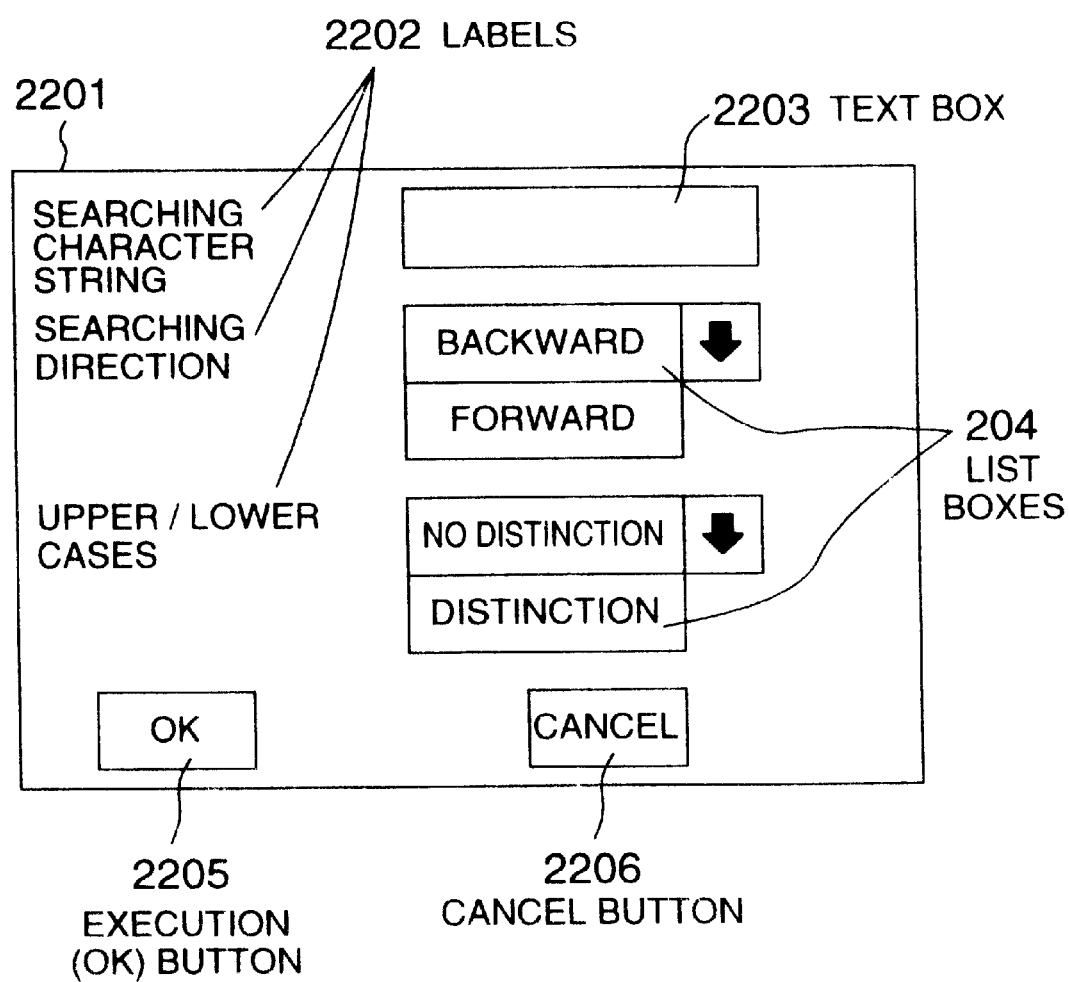
FIG. 23 shows a structure of a dialog box.

FIG. 21 is a flowchart for explaining flows of the processing operations of the command input/conversion section 102. FIG. 22 shows details of a step 2003 in FIG. 21. FIG. 23 is an example of a dialog box generated through the flowchart of FIG. 22.

As shown in FIG. 23, a dialog box 2201 generated in the present embodiment is made up of zero, one or more text boxes 2203 having a label, zero, one or more list boxes 2204 having a label, a single OK button 2205, and a single cancel button 2206.

Shown in FIG. 21 is a first example of the flows of the processing operations of the command input/conversion section 102. The operation of FIG. 21 is substantially the same as that of FIG. 6, except that the commands of the function items are not directly generated in the operation of FIG. 21. More in detail, the system generates an intermediate format of commands for the function times selected in steps 2002 and 2004. Other differences from FIG. 6 are to generate a dialog box corresponding to the function selected in the step 2003, to convert the intermediate format of command to another format of command executable in the parent document in a step 2006, and to convert the intermediate format of command to another format of command executable in the descendent document in a step 2010.

In this case, the word 'intermediate format' as used herein means that this type of command does not belong to any application programs but can be converted to a command of such a format as executable in a specific application program based on the command correspondence table 108 and command argument correspondence table 109. This type of command has such a format as 'doc.com(argl=value1, arg2=val2, . . . , argn=valn)'.

In the above format, 'doc' refers to a document to be processed, 'com' refers to any of the functions in the command correspondence table 108, 'arg1,arg2, . . . ' refer to any of argument names present in the row 0 of the command argument correspondence table 109, and 'val1, val2, . . . ' refer to any of the meanings of arguments present in the row 0 of the command argument correspondence table 109.

The conversion from the intermediate format of command to a command of the format executable for a specific application program is carried out as follows. That is, the 'doc' is used without subjected to any modification. The function name 'com' is converted to a command name for the application program. The parenthesized tic 'arg1,arg2, . . . ,' and 'val1, val2, . . . ' refer to identifiers appearing in the row 0 of the command argument correspondence table. Accordingly, the arguments of the intermediate format (arg 1, arg 2 . . . ) are converted to corresponding arguments in the associated row of the application program in the command argument correspondence table 109, and the argument values of the intermediate format (val 1, val 2 . . . ) are converted to corresponding argument values in the associated row of the application program in the command argument correspondence table 109.

Detailed explanation will then be directed to the step 2003 in FIG. 21, by referring to FIGS. 22 and 23.

First, the system repeats the following operations over all the arguments of the specified function in the command argument correspondence table 109 (step 2101). The system then selects one of the arguments to be processed (step 2102). If any of the application programs associated with the parent and descendant documents does not utilize the selected argument (step 2103), then the system returns to the step 2101. On the other hand, if any of the application programs utilizes the selected argument and the possible values of the argument are 3 types or more and selective (step 2104), then the system expresses the argument name as the form of the label 2202, adds the possible values of the argument to the list box 2204 (step 2105) and returns to the step 2101. If the possible values of the argument are not selective, then the system adds the text box 2203 having the argument name as the label 2202 (step 2106). Thereafter, the system returns to the step 2101.

When completing the operations of all the arguments in the step 2101, the system adds an execution or OK button 2205 and the cancel button 2206 and terminates its operation (steps 2107 and 2108).

Although the above explanation has been made in connection of a modification of the operation of FIG. 6 as the first embodiment, the same explanation may also hold true for FIGS. 8 and 9.

In the present embodiment, since the command correspondence table 108 and command argument correspondence table 109 can be updated based on the user's judgement, it becomes unnecessary for the application program developer to know the formats of the command correspondence table and command argument correspondence table. In the present embodiment, further, the user can update the command correspondence table and command argument correspondence table with use of such a user interface as a menu or dialog box which the user gets accustomed to using. In the present embodiment, furthermore, when it is desired to call a function, the user can also specify the arguments of the command for its descendent document on a dialog box basis. Therefore the user can give fine processing to the descendent document.

Explanation will then be made as to a third embodiment. The second embodiment has been directed to how to process a plurality of documents. In contrast to it, the third embodiment is directed to processing the operation that spans a plurality of application programs, such as processing different kinds of documents selected by the user on a file management software program as a single unit or on a batch basis, or batch-processing different kinds of documents attached to an electronic-mail on an electronic mail software program.

Though the command registration section has been explained as being formed integral with the application program in the second embodiment, in addition, the command registration section is provided as being formed separately from the application program in the present third embodiment, which will be explained below.

Figure 24:
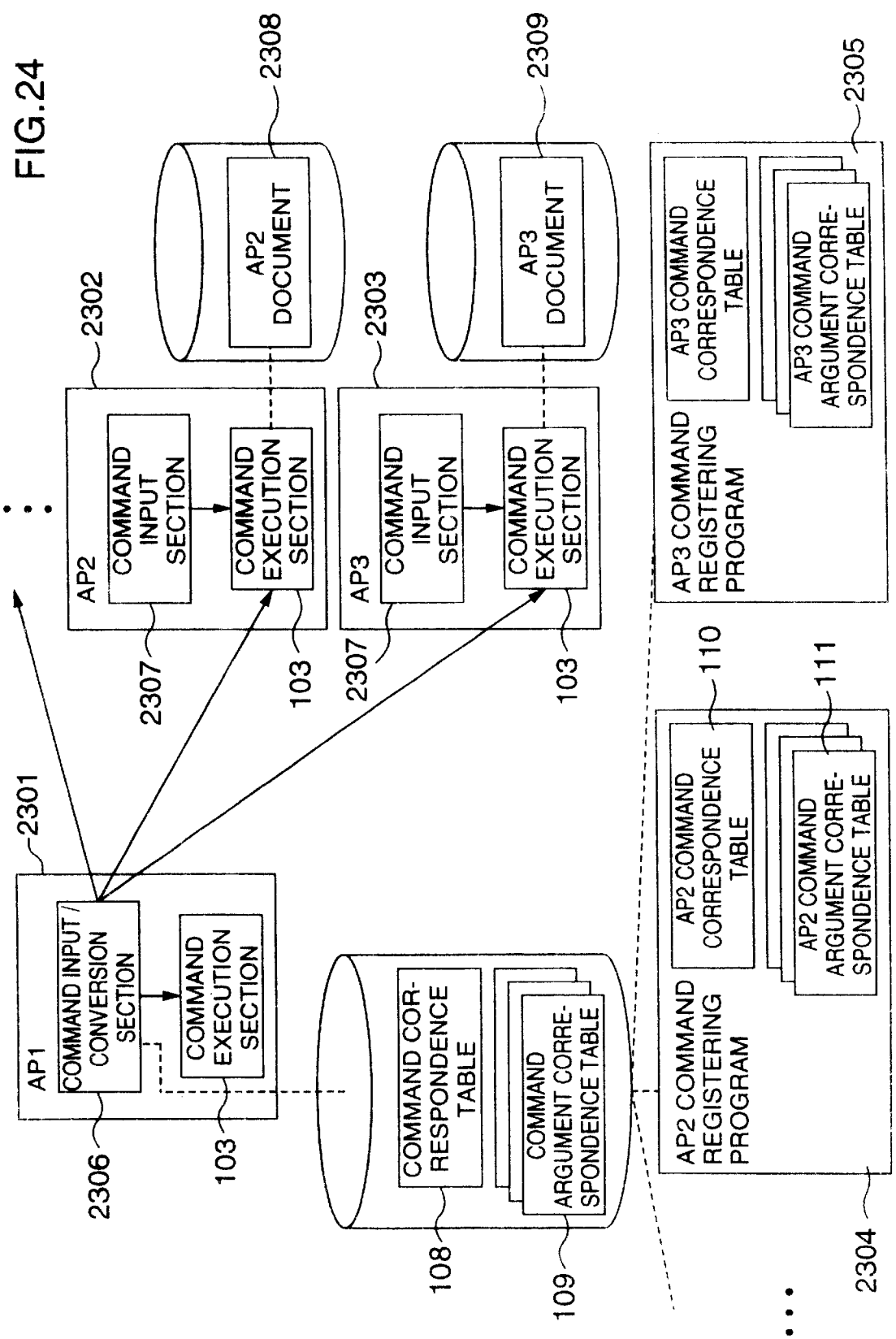
FIG. 24 is a third example of the software arrangement of the present invention.

FIG. 24 shows a software configuration of the present invention for explaining how to process a plurality of kinds of documents on a batch basis. The drawing shows an example when an application program (AP) AP1 (2301) processes documents 2308 and 2309 prepared with use of other application programs AP2 (2302) and AP3 (2303) respectively. The command execution section 103 has a structure similar to the command execution section in the first embodiment.

Further, programs 2304 and 2305 are ones for registering commands for the application programs AP2 and AP3 respectively. These programs perform the same operations as the command registration section 104 in the first embodiment, except that the application programs AP2 and AP3 are started up respectively separately. A command input section 2307 receives an input from the user, generates a command and sends the command to the command execution section 103.

Figure 25:
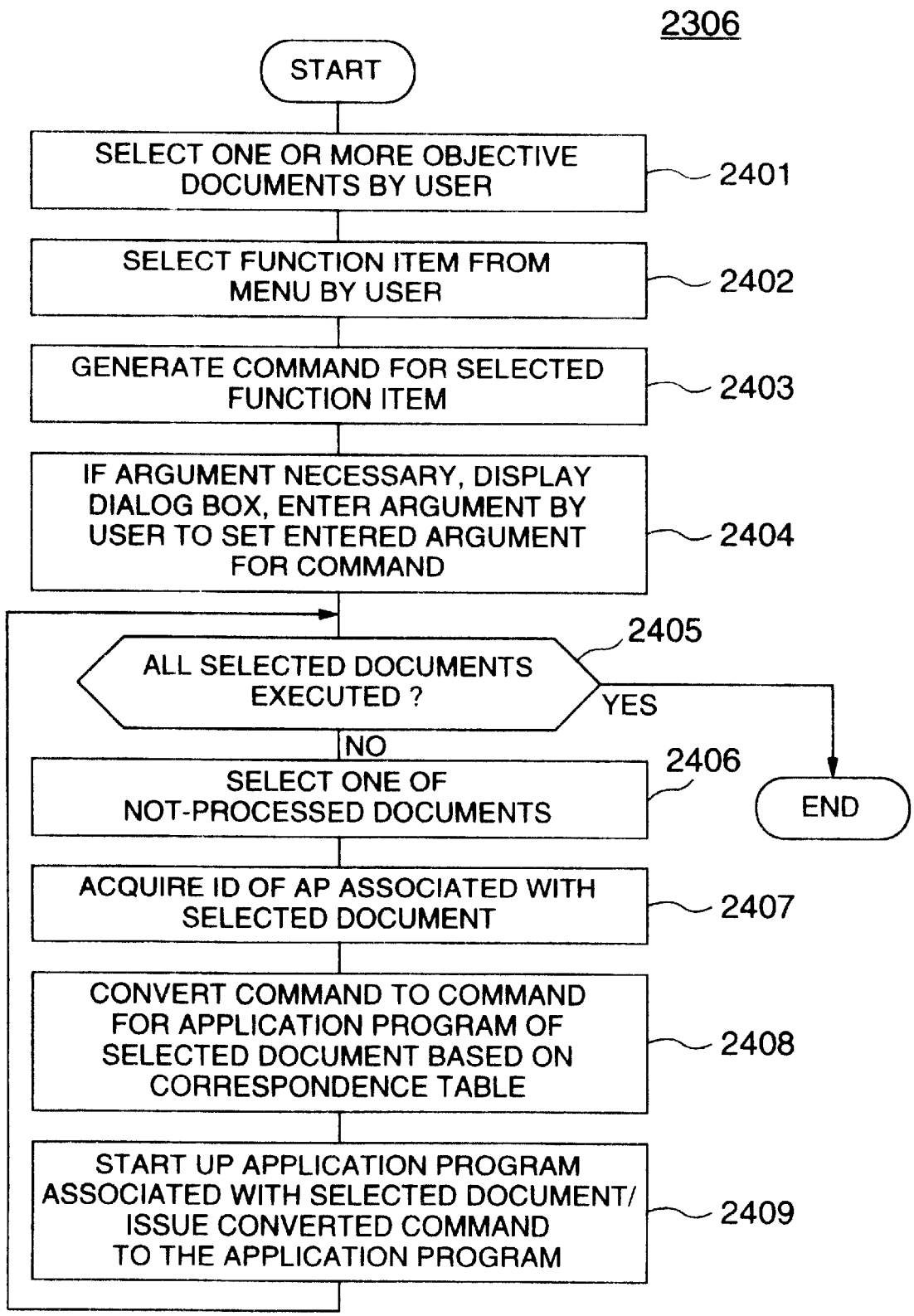
FIG. 25 is a flowchart showing another example of the flows of the processing operations of the command input/conversion section.

FIG. 25 shows a flowchart for explaining flows of processing operations of a command input/conversion section 2306. FIG. 25 is substantially the same in processing contents as FIG. 6 showing the flows of processing operations of the command input/conversion section 102 in the first embodiment. Differences of FIG. 25 from FIG. 6 are that the user selects one or more of documents to be processed in a step 2401, and to process the document or documents selected in the step 2401.

The explanation has been made as to the modification of the operation of FIG. 6 in the first embodiment, but the same modification holds true for FIGS. 8 and 9.

In the present embodiment, when it is desired to repetitively apply the same operation to different documents, the system performs its operation as follows. That is, when the user enters a command, this causes the command to be converted to a command for being able to process the respective documents. For this reason, it becomes unnecessary for the user to repeat 'starting up one of the application programs associated with one of the documents and selecting the function from menu or the like for the associated application program' with respect to each of the application programs.

In the present invention, further, the command registering operation is provided in the form of a separated program, for which reason the application program can be made small in size.

The present invention can edit a compound document corresponding to a combination of a document as well as different kinds of documents prepared with use of different application programs and embedded thereinto, with effects which follow. When the user enters a command for a parent document, the system converts the command to a command of the application program suitable for processing its descendent documents. Accordingly, it becomes unnecessary for the user to repeat the operations of 'starting up the application program associated with one of the descendent documents and selecting the function from a menu or the like on the associated application program' with respect to each of the descendent documents.

Further, in accordance with the present invention, when it is desired to process a plurality of different kinds of documents prepared with use of different types of application programs, the system performs the following operation. That is, when the user enters a command, the system converts the entered command into a command executable in the associated application programs for processing the respective documents. Accordingly, it becomes unnecessary for the user to repeat the operations of 'starting up the application program associated with one of the descendent documents and selecting the function from a menu or the like on the associated application program' with respect to each of the descendent documents.

What is claimed is:

1. An information processing method for executing, in correspondence to execution of a first application program, at least one second application program by using a processor, said method comprising the steps of:

previously storing a correspondence relationship between first and second commands of a plurality of application programs associated through a function possessed by said first and second application programs;

in response to a user entering said first command for execution in said first application program, converting, on the basis of said correspondence relationship, said first command into at least one second command corresponding each to one of said at least one second application program; and executing a function associated with said entered first command and said converted at least one second command.

2. An information processing method for executing, in correspondence to execution of a first application program, at least one second application program by using a processor, said method comprising the steps of:

previously storing a first correspondence relationship between first and second commands of a plurality of application programs commonly associated through a function possessed by said first and second application programs, and a second correspondence relationship between a plurality of arguments corresponding to each of said commands and functions possessed by said first and second application programs;

when a user enters said first command and at least one first argument corresponding to said first command for execution in said first application program, converting, on the basis of said first correspondence relationship, said first command into at least one second command corresponding each to one of said second application programs, and converting, on the basis of said second correspondence relationship, said at least one first argument into at least one second argument corresponding to each of said at least one second application program; and executing a function associated with said entered first command and said converted at least one second command.

3. A compound document processing method for performing a document operation for a compound document having a parent document and at least one child document, document preparation of said parent document being carried out with use of a first application program, document preparation of said at least one child document being carried out with use of a respective one of at least one second application program, by using a processor, said method comprising the steps of:

previously storing a correspondence relationship between a plurality of application programs and commands associated with functions possessed by said first and second application programs;

when a user enters a first command for executing said first application program, converting, on the basis of said correspondence relationship, said first command into at least one second command corresponding to each of said at least one second application program; and executing a function associated with said entered first command and said converted at least one second command.

* * * * *